United States Patent
Tomita et al.

(10) Patent No.: US 7,273,524 B2
(45) Date of Patent: Sep. 25, 2007

(54) CONCRETE COMPOSITION METHOD OF PRODUCING CONCRETE COMPOSITIONS AND CEMENT ADMIXTURE

(75) Inventors: Takashi Tomita, Toyonaka (JP); Hirokatsu Kawakami, Izumiotsu (JP)

(73) Assignee: Nippon Shokubai Co., Ltd. (JP)

( * ) Notice: Subject to any disclaimer, the term of this patent is extended or adjusted under 35 U.S.C. 154(b) by 87 days.

(21) Appl. No.: 10/469,141

(22) PCT Filed: Feb. 4, 2003

(86) PCT No.: PCT/JP03/01093

§ 371 (c)(1),
(2), (4) Date: Jan. 16, 2004

(87) PCT Pub. No.: WO03/066542

PCT Pub. Date: Aug. 14, 2003

(65) Prior Publication Data

US 2004/0107876 A1    Jun. 10, 2004

(30) Foreign Application Priority Data

Feb. 6, 2002 (JP) .............................. 2002-029845
Feb. 7, 2002 (JP) .............................. 2002-030998

(51) Int. Cl.
C04B 24/04 (2006.01)
(52) U.S. Cl. ...................... 106/728; 106/724; 106/727; 524/5
(58) Field of Classification Search ............... 106/724, 106/727, 728; 524/5
See application file for complete search history.

(56) References Cited

U.S. PATENT DOCUMENTS

| | | | |
|---|---|---|---|
| 5,660,626 A | 8/1997 | Ohta et al. | |
| 5,661,206 A | 8/1997 | Tanaka et al. | |
| 5,912,284 A * | 6/1999 | Hirata et al. | 524/5 |
| 6,174,980 B1 | 1/2001 | Hirata et al. | |
| 6,258,162 B1 | 7/2001 | Kawakami et al. | |
| 6,270,567 B1 | 8/2001 | Matsuo et al. | |
| 6,437,027 B1 * | 8/2002 | Isomura et al. | 524/5 |
| 6,486,260 B1 * | 11/2002 | Yuasa et al. | 525/327.7 |
| 2003/0087993 A1 | 5/2003 | Nishikawa et al. | |

FOREIGN PATENT DOCUMENTS

| | | |
|---|---|---|
| CN | 1189473 A | 8/1998 |
| EP | 692465 | 1/1996 |
| EP | 1041053 | 10/2000 |
| EP | 1103570 | 5/2001 |
| JP | 59-128250 A | 7/1984 |
| JP | 60-027638 | 2/1985 |
| JP | 61141652 * | 6/1986 |

(Continued)

*Primary Examiner*—Paul Marcantoni
(74) *Attorney, Agent, or Firm*—Connolly Bove Lodge & Hutz LLP; Burton A. Amernick

(57) ABSTRACT

The objective of the present invention is to provide a concrete composition in which the amount of air entrained can be maintained stably and which is excellent in strength and durability, a concrete composition which is excellent in freeze-thaw durability owing to the good quality of foams and is excellent in air content stability with time and which can form curing products excellent in strength and durability, a method of producing such concrete composition, and a cement admixture.

12 Claims, 1 Drawing Sheet

FOREIGN PATENT DOCUMENTS

| | | |
|---|---|---|
| JP | 63-011557 | 1/1988 |
| JP | 4-002641 | 1/1992 |
| JP | 7-053249 | 2/1995 |
| JP | 7-215746 | 8/1995 |
| JP | 7-232945 | 9/1995 |
| JP | 8-053522 | 2/1996 |
| JP | 8-073250 | 3/1996 |
| JP | 8-268741 | 10/1996 |
| JP | 9-241056 | 9/1997 |
| JP | 9-241057 | 9/1997 |
| JP | 10-226550 A | 8/1998 |
| JP | 10-236857 | 9/1998 |
| JP | 11-060303 | 3/1999 |
| JP | 11-060304 | 3/1999 |
| JP | 11-106248 | 4/1999 |
| JP | 11-106249 | 4/1999 |
| JP | 11-199290 | 7/1999 |
| JP | 2000-256049 | 9/2000 |
| JP | 2000-319054 | 11/2000 |
| JP | 2001-106559 | 4/2001 |
| JP | 2001-192250 | 7/2001 |
| JP | 2001-220417 | 8/2001 |
| JP | 2003-226567 A | 8/2003 |
| KR | 2000-0029225 | 5/2000 |
| WO | WO-00/17128 | 3/2000 |
| WO | WO-01/42161 | 6/2001 |
| WO | WO-01/42162 | 6/2001 |
| WO | WO-02/14237 | 2/2002 |
| WO | WO-02/088241 A1 | 11/2002 |

* cited by examiner

CONCRETE COMPOSITION METHOD OF PRODUCING CONCRETE COMPOSITIONS AND CEMENT ADMIXTURE

TECHNICAL FIELD

The present invention relates to a concrete composition, a method of producing concrete compositions, and a cement admixture. More particularly, it relates to a concrete composition comprising cement, water, a fine aggregate and a coarse aggregate as essential constituents and capable of giving curing products excellent in strength and durability, a method of producing such concrete composition, and a cement admixture.

BACKGROUND ART

Concrete compositions are produced by blending cement, water, fine aggregate and coarse aggregate together and, among cement compositions, they give curing products superior in strength and durability as compared with pastes and mortars. Therefore, they are widely and adequately used in such applications as outer walls of buildings and building structures. In such concrete compositions, a reduced water content per unit volume of concrete leads to improvements in performance of curing products. In the present concrete industry, improvements in strength and durability of concrete structures are strongly demanded and, therefore, to reduce the unit water content has become an important task.

Generally, an admixture for increasing the air entrainment and permeability is added to such concrete compositions. The task of such admixture in concrete compositions is to exhibit its dispersing ability sufficiently so that the permeability and workability of concrete compositions can be secured even when the unit water content is reduced for realizing improvements in strength and durability and, at the same time, retain its dispersing ability stably even with the lapse of time to provide good concrete compositions. Recently, the importance of such an admixture has been duly recognized and technological innovations have been made actively. In particular, a large number of polycarboxylic acid dispersants have been investigated since they exhibit a higher level of water reducing performance as compared with the conventional naphthalene-based ones and the like. The use of such a dispersant results in increased air entrainment and increased bubble size. Thus, the combined use thereof with an air entraining agent (AE agent) is in general practice for entraining fine and good-quality bubbles and thereby improving the freeze-thaw durability.

However, a drawback of the combined use of a polycarboxylic acid dispersant and an AE agent is that the amount of air entrained gradually increases with the continued kneading of concrete and, therefore, it becomes difficult to attain a desired level of concrete strength. Although it is possible to reduce the amount of air entrained temporarily using an defoaming agent known in the prior art, the continued kneading results in an increased amount of air entrained. Further, from the in-situ workability viewpoint, it is difficult to add an defoaming agent just before concrete placing; it is demanded that the addition of an defoaming agent be made in the step of preparing concrete. In cases where the addition of an AE agent is essential as a measure against freezing and thawing or where kneading is carried out for a long period of time during transportation, in particular, the increase in amount of air entrained becomes a serious problem.

Meanwhile, the addition of alkylene oxide adducts derived from specific compounds to concrete compositions or the like has been investigated.

As regards cement dispersants which comprise, as an essential constituent, a polyether polyol or polyether polyol derivative having a molecular length of 6,000 to 2,000,000 as resulting from addition, to an amine compound, of 20 to 300 moles, per active hydrogen atom of the amine compound, of alkylene oxides comprising ethylene oxide and propylene oxide as essential ones, cement dispersants have been disclosed which comprise, as an essential constituent, an adduct resulting from addition of ethylene oxide and propylene oxide, optionally together with styrene oxide, to polyethyleneimine, ethylenediamine or diethylenetriamine (cf. e.g. Patent Document 1: Japanese Kokai Publication Sho60-27638, pages 1 and 3).

As regards mixtures comprising a polycarboxylic acid salt liquefying agent for inorganic building materials, such as cement, and a butoxylated polyalkylenepolyamine or a salt thereof to be used for deaeration, there have been disclosed butoxylated polyalkylenepolyamines or polyethyleneimine-butylene oxide adducts as salts thereof (cf. e.g. Patent Document 2: Pamphlet of International Patent Application WO 00/17128, pages 1, 17 and 18).

As regards a method of adjusting the amount of air entrained which method comprises using an ethylene oxide derivative (I) of a primary amine and a water-soluble polycarboxylic acid polymer (II) in a specified weight ratio in kneading cement mortar or concrete, laurylamine-ethylene oxide adducts have been disclosed as the primary amine-derived ethylene oxide derivative (I) (cf. e.g. Patent Document 3: Japanese Kokai publication Sho63-11557, pages 1, 2 and 5).

As regards hydraulic compositions which comprise (a) a water-soluble polymer comprising a polyalkylene oxide derivative resulting from addition of 10 to 1,000 moles of an alkylene oxide to a monohydric alcohol, monohydric mercaptan, alkylphenol, amine or carboxylic acid containing 6 to 30 carbon atoms within the molecule, (b) a high-performance plasticizer, and (c) a hydraulic powder, there have been disclosed ethylene oxide adducts derived from mixtures of stearyl alcohol and cetanol, ethylene oxide and propylene oxide adducts derived from nonylphenol, ethylene oxide adducts derived from dodecylmercaptan, ethylene oxide adducts derived from palmityl alcohol, ethylene oxide adducts derived from dodecylamine, and ethylene oxide adducts derived from lauric acid, among others (cf. e.g. Patent Document 4: Japanese Kokai Publication Hei08-73250, pages 1, 2, 7 and 8).

In these technologies, however, no sufficient investigations have been made concerning how to stably maintain the amount of air entrained in concrete compositions. There is thus room for contrivance for designing the structures of alkylene oxide adducts so that they can exhibit excellent performance and give concrete compositions showing good performance excellent in strength and durability.

Further, cement admixtures comprising, as an essential constituent, a copolymer obtained by copolymerization of a monomer composition comprising (a) an oxyalkylene group-containing monomer having a specified structure and (b) an unsaturated carboxylic acid monomer and/or a salt of such copolymer have been disclosed, and the use of alkoxypolyalkylene glycols obtained by addition of an alkylene oxide containing 2 to 4 carbon atoms to an aliphatic or alicyclic alcohol having an alkyl group containing 4 or 5 carbon atoms, and a (meth)acrylic acid ester compound (cf. e.g. Patent Document 5: Japanese Kokoku Publication No. 2997243, pages 1, 5).

Cement admixtures comprising, as an essential constituent, a first copolymer obtained by copolymerization of two oxyalkylene group-containing monomers (a) and (b) each having a specified structure and not more than 50% by mass (% by mass based on the total amount of monomer constituents) of (c) an unsaturated carboxylic acid monomer and/or a salt of such copolymer have been disclosed and, thus, (meth)acrylate ester compounds have been disclosed which are derived from alkoxypolyalkylene glycols obtained by addition of an alkylene oxide containing 2 to 4 carbon atoms to an aliphatic or alicyclic alcohol having an alkyl group containing 4 to 30 carbon atoms have been disclosed as the monomer (a) and a monomer (b) whose terminal oxyalkylene group ends in an alkyl group smaller in number of carbon atoms than in the terminal oxyalkylene group of the monomer (a) or in a hydrogen atom (cf. e.g. Patent Document 6: Japanese Kokoku Publication No. 2992511, pages 1,2,4 and 5).

Cement admixtures comprising, as an essential constituent, a copolymer obtained by polymerizing (a) a polyalkylene glycol monoester monomer having a specified structure and (b) at least one monomer selected from among acrylic monomers and unsaturated dicarboxylic acid monomers or a salt of such polymer and, thus, there have been disclosed ester compounds derived from alkoxypolyalkylene glycols obtained by addition of an alkylene oxide containing 2 or 3 carbon atoms to alcohols containing 6 to 30 carbon atoms as the polyalkylene glycol monoester monomer (a) and (meth) acrylic acid (cf. e.g. Patent Document 7: Japanese Kokai Publication Hei11-60303, pages 1, 2 and 3). Further, cement admixtures have been disclosed which comprise, as an essential constituent, a copolymer comprising, as essential constituents, (a) a polyalkylene glycol monomer having a specified structure, (b) a polyalkylene glycol monoester monomer having a terminal hydrocarbon group containing a smaller number of carbon atoms than the number of carbon atoms in the terminal group of the polyoxyalkylene group in monomer (a) and at least one monomer (c) selected from among acrylic monomers and unsaturated dicarboxylic acid monomers, or a salt of such copolymer, and (meth)acrylic acid ester compounds with alkoxypolyalkylene glycols obtained by addition of an alkylene oxide containing 2 or 3 carbon atoms to alcohols containing 6 to 30 carbon atoms and having a benzene ring have been disclosed as the polyalkylene glycol monomer (a) (cf. e.g. Patent Document 8: Japanese Kokai Publication Hei11-60304, pages 1, 2 and 5).

As regards concrete admixtures comprising, as a main component, a copolymer composed of (a) an unsaturated bond-containing polyalkylene glycol monoester monomer having a specified structure and (b) a monomer copolymerizable with the monomer (a), esterification products from a polyalkylene glycol adduct of alcohol containing 6 to 18 carbon atoms and (meth)acrylic acid (cf. e.g. Patent Document 9: Japanese Kokai Publication Hei09-241056, pages 1, 2 and 3) and alkylphenoxypolyethylene glycol monoesters and alkylphenoxypolypropylene glycol monoesters (c.f. e.g. Patent Document 10: Japanese Kokai Publication H09-241057, pages 1, 2 and 3) have been disclosed as the polyalkylene glycol monoester monomer (a).

Dispersants for powder-water system slurries which comprise a copolymer (A) composed of (a) an α,β-unsaturated carboxylic acid (salt), (b) a $C_{6-30}$ monoolethylene oxide (15–50 moles) adduct (meth)acrylate and (c) a hydrophobic unsaturated monomer, if necessary together with (d) another copolymerizable monomer (cf. e.g. Patent Document 11: Japanese Kokai Publication Hei08-53522, pages 1 and 2) and shrinkage-reducing dispersing agent for use in cementitious composition which comprise a graft polymer resulting from chemical binding of oligoalkylene glycols and/or polyhydric alcohols to side chains of a polycarboxylic acid or a salt thereof or which comprise a graft polymer resulting from chemical binding of oligoalkylene glycols and/or polyhydric alcohols and a polyalkylene glycol or a derivative thereof to side chains of a polycarboxylic acid or a salt thereof have been disclosed (c.f. e.g. Patent Document 12: Japanese Kokai Publication Hei08-268741, pages 1 and 2).

In these technologies, however, no sufficient investigations have been made concerning how to improve the freeze-thaw durability or stably maintain the amount of air entrained in concrete compositions. Thus, there is room for contrivance for designing more adequate alkylene oxide adduct structures to thereby provide concrete compositions capable of exhibiting good performance in these respects and with respect to strength and durability, or room for investigation for enabling concrete compositions to show sufficient levels of permeability even when the amount of water relative to cement is further reduced.

Further, an agent for improving the surface appearance of cement moldings which comprises a polyalkylene glycol derivative(s) composed of a polyethylene glycol-polypropylene oxide adduct and/or an ethylenediamine-polyethylene oxide adduct-polypropylene oxide adduct (cf. e.g. Patent Document 13: Japanese Kokai Publication Hei11-199290, pages 1 and 2) and a cement additive composition comprising a mixture, in a specified ratio, of a polycarboxylic acid compound and a nitrogen-containing polyoxyalkylene compound having a specific structure (cf. e.g. Patent Document 14: Japanese Kokai Publication Hei07-232945, pages 1 and 2) have been disclosed. In these technologies, however, no investigation has been made concerning the case of an AE agent being used. Thus, there is room for contrivance for providing concrete compositions capable of exhibiting excellent performance even when an AE agent is used and, at the same time, capable of providing good strength and durability characteristics.

Furthermore, an admixture for use in cementitious compositions which comprises a water-soluble air-controlling agents and a dispersant each for cement compositions (cf. e.g. Patent Document 15: pamphlet of International Patent Application WO 01/42161 A2, pages 1 and 28) and an admixture for cementitious compositions which comprises a water-insoluble defoaming agent and a dispersant each for cement compositions, together with a dissolving agent for the water-insoluble defoaming agent (cf. e.g. Patent Document 16: pamphlet of International Patent Application WO 01/42162 A1, pages 1 and 24) have been disclosed. As regards these admixtures for cementitious compositions, however, there is room for investigation concerning how to enable them to exhibit good strength and durability performance by designing the structure of each defoaming agent.

SUMMARY OF THE INVENTION

It is an object of the present invention made in view of the above-mentioned state of the art to provide a concrete composition in which the air content will not increase even when the time of kneading is prolonged in the step of concrete composition production, in which the amount of air entrained can be maintained stably and which is excellent in strength and durability, a concrete composition which is excellent in freeze-thaw durability owing to the good quality of foams and is excellent in air content stability with time and which can form curing products excellent in strength and durability, a method of producing such concrete composition, and a cement admixture.

In the course of their investigations concerning various cement additives and cement admixtures, the present inventors made investigations in search of an admixture capable of stably maintaining an amount of air entrained in concrete compositions and, in the course of their investigations, they first paid attention to the fact that an admixture comprising, as essential constituents, an defoaming agent and a polycarboxylic acid polymer can exhibit good water reducing ability and at the same time can control the amount of air entrained and, further, they paid attention to the fact that an oxyalkylene group-containing polyoxyalkylene-based compound having at least one nitrogen atom within the molecule can function as an defoaming agent, making concrete compositions containing such compound capable of exhibiting good strength and durability performance. It was found that, in such concrete compositions, the defoaming ability can last when the polyoxyalkylene-based compound has oxyethylene groups and oxyalkylene groups containing 3 or more carbon atoms. Thus, while it is considered in the prior art that the defoaming agent to be used in concrete compositions had better to be highly hydrophobic, it was found that when the polyoxyalkylene-based compound has at least one nitrogen atom and the hydrophilicity thereof is increased by means of oxyethylene groups, the compound can effectively control the foams generated by an air entraining agent (AE agent) or the like and can control the increase in air content as otherwise caused by the prolongation of the kneading time in the step of concrete composition production. Furthermore, it was found that when such polyoxyalkylene-based compound has, within the molecule thereof, an aliphatic hydrocarbon structure comprising at least 5 carbon atoms which are consecutively bound, it shows increased defoaming activity.

Further, in the course of investigations in search of a concrete composition excellent in such characteristics as freeze-thaw durability, they paid attention to the fact that the freeze-thaw durability is influenced by such foam quality features as foam sizes and foam-to-foam distances and, when such foam quality features are good, namely when minute foams occur densely, the freeze-thaw durability can be improved. It was thus found that concrete compositions having a specified spacing factor, indicative of the mean foam-to-foam distance, are excellent in freeze-thaw durability. It was further found that when the increment in air content with time is specified in such concrete compositions, the above objects can be successfully accomplished owing to synergy of the effects of specifying the spacing factor value and air content increase. Thus, it was found that a concrete composition of which the spacing factor value is specified at a low level and the increment in air content after start of kneading is specified at a low level is excellent in such characteristics as freeze-thaw durability and can form curing products showing good strength and durability performance. Furthermore, it was found that when such concrete composition has a specific surface value, which is indicative of the size of foams, the quality of foams in the concrete composition can be improved and, accordingly, the freeze-thaw durability and other characteristics can be further improved.

Further, during the course of an investigation concerning such an admixture for use in concrete compositions, it was found that a structurally specified polycarboxylic acid polymer having a terminal long-chain alkyl group, such as a butyl group can entrain air in the form of minute foams, and that this makes it unnecessary to use any AE agent and/or defoaming agent and thus makes it possible to control the increase in air content with time in concrete compositions. The inventors thus came to realize that such polycarboxylic acid polymer can judiciously be applied in the concrete compositions mentioned above. Furthermore, they found that such concrete compositions can be still further improved in strength and durability by reducing the proportion, by mass, of water relative to cement therein. These findings have now led to completion of the present invention.

Thus, the present invention consists in a concrete composition comprising an defoaming agent, a polycarboxylic acid polymer, cement, water, fine aggregate and coarse aggregate, as essential constituents, wherein the above-mentioned defoaming agent comprises a polyoxyalkylene compound having at least one nitrogen atom within the molecule and having an oxyethylene group or groups and an oxyalkylene group or groups comprising not less than 3 carbon atoms and further having an aliphatic hydrocarbon structure comprising at least 5 consecutively bound carbon atoms.

The present invention also consists in a concrete composition comprising a polycarboxylic acid polymer, cement, water, fine aggregate and coarse aggregate, as essential constituents, wherein the above-mentioned concrete composition has a spacing factor value of not more than 0.3 mm and shows an increase in air content of not more than 3% in the period of 5–15 minutes after the start of kneading.

DETAILED DESCRIPTION OF THE INVENTION

In the following, the present invention is described in detail.

The concrete composition according to the present invention is either of the form (1) comprising, as essential constituents, an defoaming agent having a specific structure, a polycarboxylic acid polymer, cement, water, fine aggregate and coarse aggregate or of the form (2) comprising, as essential constituents, a polycarboxylic acid polymer, cement, water, fine aggregate and coarse aggregate, having a specified spacing factor value and showing a specified air content increase. Such concrete compositions are also referred to herein as "concrete composition of form (1)" and "concrete composition of form (2)", respectively. In the practice of the present invention, the form (1) and form (2) may be used in combination.

First, the essential constituents of the concrete compositions of the present invention are described.

The defoaming agent to be used according to the present invention comprises a polyoxyalkylene compound having at least one nitrogen atom within the molecule and having an oxyethylene group or groups and an oxyalkylene group or groups containing not less than 3 carbon atoms and further having an aliphatic hydrocarbon structure containing at least 5 consecutively bound carbon atoms. One or two or more such polyoxyalkylene compounds may be used.

The above-mentioned polyoxyalkylene compound may also be used in the form resulting from neutralization of the nitrogen atom with an acidic substance such as an inorganic acid, e.g. hydrochloric acid, sulfuric acid or nitric acid, or acetic acid, propionic acid, (meth)acrylic acid or the like. When such polyoxyalkylene compound is blended with a free carboxyl group-containing polycarboxylic acid polymer, which is to be mentioned later herein, the free carboxyl groups of the polycarboxylic acid polymer are neutralized with the nitrogen atom in the polyoxyalkylene compound to form a salt, whereby the solubility in water of the polymer is improved. Thus, the storage stability of such polyoxyalkylene compound-polycarboxylic acid polymer blend in aqueous medium solution is very good.

The above-mentioned oxyethylene group(s) and oxyalkylene group(s) containing not less than 3 carbon atoms preferably occur in the added from, namely as polyoxyalkylene groups, in the polyoxyalkylene compound and, when the polyoxyalkylene compound has two or more of polyoxyalkylene groups in each molecule, they may be the same or different. The above-mentioned oxyalkylene group(s) containing not less than 3 carbon atoms preferably contain not more than 8 carbon atoms, more preferably not more than 6 carbon atoms, still more preferably not more than 4. The mode of addition of the two or more alkylene oxide species, namely ethylene oxide and an alkylene oxide or oxides containing not less than 3 carbon atoms, may be of the random, block, alternating or any other addition type. Preferred is the blockwise mode of addition of oxyethylene groups and oxyalkylene groups containing 3 or more carbon atoms.

The polyoxyalkylene compound to be used in accordance with the present invention has at least one aliphatic hydrocarbon structure containing at least 5 consecutively bound carbon atoms. The aliphatic hydrocarbon structure comprising at least 5 consecutively bound carbon atoms includes aliphatic hydrocarbon groups containing 5 or more consecutively bound carbon atoms as well as oxyalkylene groups having a structure containing 5 or more consecutively bound carbon atoms but is not limited thereto provided that such a structure occurs within the molecule. Thus, for example, an aliphatic hydrocarbon structure containing 5 or more consecutively bound carbon atoms may be included among the oxyalkylene groups containing not less than 3 carbon atoms, or an aliphatic hydrocarbon structure containing 5 or more consecutively bound carbon atoms may be included in the terminal hydrocarbon moiety. Such aliphatic hydrocarbon structure preferably contains 8 or more, more preferably 10 or more, still more preferably more than 12 consecutively bound carbon atoms. When a polyoxyalkylene compound having an aliphatic hydrocarbon structure longer in number of carbon atoms than 12 is used, the quality of air in concrete compositions can be made still better. The number of such carbon atoms is preferably not more than 30, still more preferably not more than 22.

Preferred as the polyoxyalkylene compound to be used in the practice of the present invention are compounds represented by the following general formula (3):

X—[(AO)n—R$^5$]k  (3)

wherein X represents the residue of an active hydrogen-containing compound, the R$^5$ groups are the same or different and each represents a hydrogen atom, a hydrocarbon group, —Y—NR$^6$R$^7$, —COR$^8$, or —CH$_2$CH$_2$NHCO—R$^9$ (Y representing an alkylene group containing 1 to 10 carbon atoms, R$^6$ and R$^7$ being the same or different and each representing a hydrogen atom or a hydrocarbon group containing 1 to 30 carbon atoms, R$^8$ and R$^9$ each representing a hydrocarbon group containing 1 to 30 carbon atoms or a group having at least one carboxyl or sulfonyl group or a salt thereof), the AO groups are the same or different and each represents an oxyalkylene group containing 2 to 18 carbon atoms, the n are the same or different and each n represents the mean number of moles of the oxyalkylene group added and is equal to 1 to 300, k is 1 to 300 and wherein, when the total number of moles of the oxyethylene group and the total number of the oxyalkylene group(s) containing not less than 3 carbon atoms in the above-mentioned oxyalkylene groups are represented by u and v, respectively, the relations 0.1<u/(u+v)<0.9 and 1<u+v<300 are satisfied. In the polyoxyalkylene compound represented by the general formula (3), the group represented by X and/or the group represented by R$^5$ has a nitrogen atom.

In the above-mentioned general formula (3), X represents the residue of an active hydrogen-containing compound. The residue of an active hydrogen-containing compound means a group having a structure resulting from the removal of the active hydrogen(s) from the active hydrogen-containing compound but is not particularly limited to the groups formed by reaction with an active hydrogen-containing compound. In the polyoxyalkylene compound, the residue of an active hydrogen-containing compound may comprise one species or two or more species. Suitable as such group or groups are alcohol residues having a structure resulting from the removal of the active hydrogen atom(s) from the hydroxyl group(s) of alcohols, carboxylic acid residues having a structure resulting from the removal of the active hydrogen atom(s) from the carboxyl group(s) of carboxylic acids, amine residues having a structure resulting from the removal of the active hydrogen atom(s) from the amino group(s) of amines, imine residues having a structure resulting from the removal of the active hydrogen atom(s) from the imino group(s) of imines, and residues having a structure resulting from the removal of the active hydrogen atom(s) from the thiol group(s) of thiols. Among them, alcohol residues and amine or imine residues are preferred. The structural form of the active hydrogen-containing compound residue may be straight, branched, or three dimensionally crosslinked.

In the preferred embodiments of the active hydrogen-containing compound residues mentioned above, residues having a structure resulting from the removal of the active hydrogen atom(s) from monohydric alcohols or from polyhydric alcohols such as trimethylolpropane, pentaerythritol, polyglycerol and sorbitol are preferred as the alcohol residues, residues having a structure resulting from the removal of the active hydrogen atom(s) from monoamines or polyamines are preferred as the amine residues, and residues having a structure resulting from the removal of the active hydrogen atom from diethyleneimine and polyethyleneimine are preferred as the imine residues.

In the above-mentioned general formula (3), the R$^5$ groups are the same or different and each represents a hydrogen atom, a hydrocarbon group, —Y—NR$^6$R$^7$, —COR$^8$, or —CH$_2$CH$_2$NHCO—R$^9$. Preferred as the hydrocarbon group are straight or branched alkyl groups containing 1 to 30 carbon atoms; benzene ring-containing aromatic groups containing 6 to 30 carbon atoms such as phenyl, alkylphenyl, phenylalkyl, (alkyl)phenyl-substituted phenyl, and naphthyl groups; alkenyl groups containing 2 to 30 carbon atoms; and alkynyl groups containing 2 to 30 carbon atoms. While the hydrocarbon group contains 1 or more carbon atoms, it preferably contains 2 or more, more preferably 5 or more, still more preferably more than 12 carbon atoms, so that the polyoxyalkylene compound may show a high level of defoaming performance. On the other hand, the number of carbon atoms is preferably not more than 30, more preferably not more than 22, still more preferably not more than 18. Among such hydrocarbon groups, straight or branched alkyl and alkenyl groups are particularly preferred.

The above-mentioned Y represents an alkylene group containing 1 to 10 carbon atoms, preferably not less than 2 but not more than 8. The above-mentioned $R^6$ and $R^7$ each represents a hydrogen atom or a hydrocarbon group containing 1 to 30 carbon atoms. In cases when no aliphatic hydrocarbon structure containing 5 or more carbon atoms bound together occurs in X or AO in the general formula (3), the hydrocarbon group represented by $R^6$ and/or $R^7$ preferably contains not less than 5, more preferably not less than 8, still more preferably not less than 10, most preferably more than 12 carbon atoms. On the other hand, the number of carbon atoms is preferably not more than 22. Conversely, when an aliphatic hydrocarbon structure containing 5 or more consecutively bound carbon atoms occurs in X or AO, each of $R^6$ and $R^7$ is preferably a hydrogen atom. $R^8$ and $R^9$ each represents a hydrocarbon group containing 1 to 30 carbon atoms or a group having one or more carboxyl or sulfonyl groups in free or salt form. In cases when no aliphatic hydrocarbon structure containing 5 or more consecutively bound carbon atoms occurs in X or AO in the general formula (3), hydrocarbon groups containing 5 or more carbon atoms are preferred. Conversely, when an aliphatic hydrocarbon structure containing 5 or more consecutively bound carbon atoms occurs in X or AO, each is preferably a group having one or more carboxyl or sulfonyl groups in free or salt form. Among the hydrocarbon groups, straight or branched alkyl and alkenyl groups are particularly preferred.

The above-mentioned AO represents an oxyalkylene group containing 2 to 18 carbon atoms. The number of carbon atoms is preferably not more than 8, still more preferably not more than 6, most preferably not more than 4, however. The mode of addition of the oxyethylene group(s) and an oxyalkylene group(s) containing not less than 3 carbon atoms may be of the random, block, alternating or any other addition type. Preferred is the blockwise mode of addition. The above-mentioned u and v represent the total number of moles of the oxyethylene group added and the total number of moles of the oxyalkylene group(s) containing not less than 3 carbon atoms as added and, preferably, they satisfy the relations $0.1<u/(u+v)<0.9$ and $1<u+v<300$. More preferably, the sum (u+v) exceeds 5, still more preferably exceeds 10, but the sum is preferably less than 200, more preferably less than 150, still more preferably less than 100, especially preferably less than 80, most preferably less than 50. In the general formula (3), the average number n of moles added means the average value of numbers of moles of the oxyalkylene group added in each mole of one and the same unit among the units represented by $[(AO)n-R^5]$.

Preferably, the ratio u/(u+v) of the total number u of moles of the oxyethylene group added to the total number (u+v) of moles of the alkylene oxides added satisfies the relation $0.1<u/(u+v)<0.9$. When the ratio is not less than 0.9, the hydrophilicity may become too strong, possibly leading to insufficient defoaming activity. When it is below 0.1, the defoaming activity may not be maintained. Thus, in either case, the strength of each curing product will become lowered. Preferably, the value of u/(u+v) exceeds 0.15, more preferably exceeds 0.2, most preferably exceeds 0.3. On the other hand, the value is preferably less than 0.8, more preferably less than 0.7, still more preferably less than 0.55, most preferably less than 0.5.

Preferably, the value (u+v) satisfies the relation $1<u+v<300$. The value (u+v) preferably exceeds 5, more preferably exceeds 10, but preferably is less than 200, more preferably less than 150, still more preferably less than 100, especially preferably less than 80, most preferably less than 50.

The above-mentioned k is 1 to 300 but preferably is not more than 200, more preferably not more than 100. When k is 2 or more, namely when two or more of groups represented by $-[(AO)n-R^5]$ are bound to X, the groups represented by $-[(AO)n-R^5]$ may be the same or different.

Since the polyoxyalkylene compound represented by the above-mentioned general formula (3) has, within the molecule thereof, at least one aliphatic hydrocarbon structure comprising at least 5 consecutively bound carbon atoms, the aliphatic hydrocarbon structure comprising at least 5 consecutive carbon atoms occurs in at least one of the structures represented by $R^5$, X, $R^5$—AO and AO which constitute the polyoxyalkylene compound of general formula (3). Preferably, such aliphatic hydrocarbon structure comprises at least 10 consecutively bound carbon atoms. The number of such carbon atoms is preferably not more than 30, more preferably not more than 22.

In the practice of the present invention, the polyoxyalkylene compound preferably has a molecular weight of not more than 10,000, more preferably not more than 5,000. Further preferably, the molecular weight is not less than 100, more preferably not less than 200.

Suitable as the compound represented by the above-mentioned general formula (3) are primary amines having a straight or branched alkyl group containing 1 to 30 carbon atom(s) or secondary amines having two equal or different alkyl group species, such as (di)methylamine, (di)ethylamine, (di)propylamine, (di)butylamine, (di)pentylamine, (di)hexylamine, (di)heptylamine, (di)octylamine, (di)nonylamine, (di)decylamine, (di)dodecylamine, (di)tetradecylamine, (di)pentadecylamine, (di)hexadecylamine, (di)heptadecylamine, (di)octadecylamine, (di)nonadecylamine and (di)icosylamine; mixtures of primary amines having a straight or branched alkyl group containing 1 to 30 carbon atom(s) but differing in alkyl group species, for example coconut oil fatty acid-derived primary amines, oleic acid-derived primary amines, soybean oil fatty acid-derived primary amines, beef tallow fatty acid-derived primary amines and hardened beef tallow fatty acid-derived primary amines; mixtures of secondary amines having straight or branched alkyl groups containing 1 to 30 carbon atom(s) but differing in alkyl group species, for example coconut oil fatty acid-derived secondary amines, oleic acid-derived secondary amines, soybean oil fatty acid-derived secondary amines, beef tallow fatty acid-derived secondary amines and hardened beef tallow fatty acid-derived secondary amines; primary or secondary amines having a benzene ring-containing aromatic group(s) containing 6 to 30 carbon atoms, such as phenyl, alkylphenyl, phenylalkyl, (alkyl)phenyl-substituted phenyl, naphthyl and the like, or an alkenyl group containing 2 to 30 carbon atoms or an alkynyl group containing 2 to 30 carbon atoms; ethylene oxide-$C_{3-18}$ alkylene oxide adducts derived from amines such as alkanolamines, for example, monoethanolamine, diethanolamine and triethanolamine.

Suitable as the compound containing two or more nitrogen atoms in the compound represented by the above-mentioned general formula (3) are ethylene oxide-$C_{3-18}$ alkylene oxide adducts derived from amide amines obtained by dehydration condensation of polyalkylenepolyamines, such as ethylenediamine, propylenediamine, diethylenetriamine, triethylenetetramine, dipropylenetriamine and tetrapropylenepentamine, with fatty acids, such as acetic acid, propionic acid, butyric acid, valeric acid, lauric acid, stearic acid, oleic acid, coconut oil-derived fatty acids, soybean-derived fatty acids, beef tallow-derived fatty acid and hardened beef tallow-derived fatty acids; ethylene oxide-$C_{3-18}$ alkylene oxide adducts derived from imidazolines obtained by further dehydration of amide amines resulting from dehydration condensation of polyalkylenepolyamines, such as ethylenediamine, propylenediamine, diethylenetriamine, triethylenetetramine, dipropylenetriamine and tetrapropylenepentamine, with fatty acids, such as acetic acid, propionic acid, butyric acid, valeric acid, lauric acid, stearic acid, oleic acid, coconut oil-derived fatty acids, soybean-derived fatty acids, beef tallow-derived fatty acid and hardened beef tallow-derived fatty acids; ethylene oxide-$C_{3-18}$ alkylene oxide adducts derived from polyalkylenepolyamines such as ethylenediamine, propylenediamine, diethylenetriamine, triethylenetetramine, dipropylenetriamine and tetrapropylenepentamine; ethylene oxide-$C_{3-18}$ alkylene oxide adducts derived from $C_{1-30}$ hydrocarbon modifications of polyalkylenepolyamines such as ethylenediamine, propylenediamine, diethylenetriamine, triethylenetetramine, dipropylenetriamine and tetrapropylenepentamine; ethylene oxide-$C_{3-18}$ alkylene oxide adducts derived from polyalkyleneimines obtained by alkyleneimine polymerization, for example from polyethyleneimine and polypropyleneimine obtained by polymerization of ethyleneimine and propyleneimine, respectively; ethylene oxide-$C_{3-18}$ alkylene oxide adducts derived from polyalkyleneimines obtained by polymerization of $C_{1-30}$ alkyleneimines, for example from polyethyleneimine or polypropyleneimine obtained by polymerization of the corresponding hydrocarbon group-modified ethyleneimine or propyleneimine, respectively; and ethylene oxide-$C_{3-18}$ alkylene oxide adducts derived from alkylaminopropylamines obtained by addition of acrylonitrile to primary or secondary amines having a $C_{1-30}$ hydrocarbon group or groups, followed by reduction.

The following compounds are also suited for use as the nitrogen atom-containing polyoxyalkylene compound in the practice of the present invention.

Amines derived from the introduction of amino group to polyoxyalkylenes obtained by addition of ethylene oxide and a $C_{3-18}$ alkylene oxide(s) to primary alcohols having a $C_{1-30}$ hydrocarbon group; amines derived from the introduction of amino group to polyoxyethylene-polyoxyalkylenes having a hydroxyl group at each terminus; amines derived from the introduction of amino group to polyoxyalkylenes obtained by addition of ethylene oxide and a $C_{3-18}$ alkylene oxide(s) to polyhydric alcohols having at least 3 hydroxyl groups within the molecule; and amines derived from the introduction of amino group to polyoxyalkylenes obtained by addition of ethylene oxide and a $C_{3-18}$ alkylene oxide(s) to alcohols having an acetylene group(s) within the molecule.

Among various methods employable for the amino group introduction, the method which uses various amination reagents for converting the hydroxyl group itself to an amino group, and the method which comprises adding an alkyleneimine, such as ethyleneimine or propyleneimine, to the hydroxyl group are preferred.

Suitable as the above-mentioned univalent alcohol having a hydrocarbon group containing 1 to 30 carbon atom(s) are straight or branched saturated alcohols such as methanol, ethanol, propanol, isopropanol, butanol, pentanol, hexanol, octanol, lauryl alcohol, cetyl alcohol, stearyl alcohol and other straight or branched alcohols containing 12 to 14 carbon atoms; unsaturated alcohols such as allyl alcohol, methallyl alcohol, 3-methyl-3-buten-1-ol, 3-methyl-2-buten-1-ol, 2-methyl-3-buten-2-ol and oleyl alcohol; and aromatic alcohols such as phenol, nonylphenol and benzyl alcohol, etc.

Suited for use as the above-mentioned polyoxyethylene-polyoxyalkylenes having a hydroxyl group at each terminus are polyoxyethylene-polyoxypropylene, polyoxyethylene-polyoxybutylene, and like AB block type ones; and polyoxyethylene-polyoxypropylene-polyoxyethylene, polyoxypropylene-polyoxyethylene-polyoxypropylene, polyoxyethylene-polyoxybutylene-polyoxyethylene, and like ABA block type ones.

Suitable as the above-mentioned polyhydric alcohols having at least 3 hydroxyl groups within the molecule are trimethylolpropane, pentaerythritol, polyglycerol, and sorbitol.

Suitable as the alcohols having an acetylene group(s) within the molecule are 2,4,7,9-tetramethyl-5-decyn-4,7-diol, 2,5-dimethyl-3-hexyn-2,5-diol, and 3-methyl-1-butyn-3-ol.

In cases where there is no aliphatic hydrocarbon structure comprising at least 5 consecutively bound carbon atoms contained at all within the molecule of the above-mentioned polyoxyalkylene compound, such an aliphatic hydrocarbon structure can adequately be introduced into the same during or after synthesis thereof by partial addition of an alkylene oxide containing 5 or more carbon atoms or by reaction with an alkyl halide containing 5 or more carbon atoms.

Compounds obtained by further addition of an alkylene oxide, such as ethylene oxide, or an alkyleneimine, such as ethyleneimine, to the terminal functional group(s) of the polyoxyalkylene compounds mentioned hereinabove can also be used as the polyoxyalkylene compound in the practice of the present invention.

Furthermore, compounds obtained by reacting an acid anhydride, such as acetic anhydride or butyric anhydride, with the terminal functional group(s) of the polyoxyalkylene compounds mentioned hereinabove can also be used as the polyoxyalkylene compound in the practice of the present invention.

The following are also suited for use as the polyoxyalkylene compound in the practice of the present invention.

Compounds obtained by ester bond formation between the polyoxyalkylene compounds mentioned hereinabove and a compound having two or more carboxyl groups with at least one carboxyl group being retained; compounds obtained by ester bond formation between the polyoxyalkylene compounds mentioned hereinabove and a compound having a carboxylic group(s) and a sulfonyl group(s) with at least one sulfonyl group being retained; compounds obtained by amide bond formation between the polyoxyalkylene compounds mentioned hereinabove and a compound having two or more carboxyl groups with at least one carboxyl group being retained; and compound obtained by amide bond formation between the polyoxyalkylene compounds mentioned hereinabove and a compound having a carboxyl group(s) and a sulfonyl group(s) with at least one sulfonyl group being retained.

In such polyoxyalkylene compounds, the retained carboxyl or sulfonyl group may be in the form of various metal salts, such as the sodium salt or calcium salt obtained by neutralization with sodium hydroxide, calcium hydroxide or other bases, ammonium salt, amine salts and other salts.

Suitable as the above-mentioned compound having two or more carboxyl groups are unsaturated dicarboxylic acids such as maleic acid, fumaric acid, phthalic acid and itaconic acid, and metal salts, ammonium salts and amine salts thereof; saturated dicarboxylic acids such as succinic acid, malonic acid, glutaric acid and adipic acid, and metal salts, ammonium salts and amine salts thereof; low-molecular-weight polymers of an unsaturated monocarboxylic acid or unsaturated dicarboxylic acid, such as acrylic acid oligomers, methacrylic acid oligomers and maleic acid oligomers, and metal salts, ammonium salts and amine salts thereof; and so forth.

The above-mentioned polyoxyalkylene compounds can be obtained, for example, by reacting a hydroxyl group-terminated polyoxyalkylene compound with an acid anhydride, such as maleic anhydride or succinic anhydride, in the absence of any solvent or in an appropriate solvent. An appropriate basic catalyst is preferably used on that occasion. Alternatively, they can also be obtained by esterification in the manner of dehydration of a hydroxyl group-terminated polyoxyalkylene compound with a carboxylic acid, or by transesterification between a hydroxyl group-terminated polyoxyalkylene compound and an ester compound.

In the present invention, among the polyoxyalkylene compounds represented by the general formula (3), those in which $R^5$ is a hydrogen atom or X has —OH or —NH$_2$ can be esterified or amidated with an unsaturated carboxylic acid, such as (meth)acrylic acid or maleic acid, whereby unsaturated monomers having defoaming activity can be synthesized. When these unsaturated monomers having defoaming activity are copolymerized with a monomer(s) giving a constituent unit(s) represented by the general formula (4), general formula (5), general formula (6) and/or general formula (7) to be given later herein to thereby incorporate the defoaming component in the polymer skeletons. Such polymers constitute an aspect of the present invention.

The level of addition of the above-mentioned polyoxyalkylene compound in the concrete composition according to the present invention is preferably not less than 0.0001% by mass but not more than 1.0% by mass, relative to the mass of cement. At addition levels below 0.0001% by mass, unsatisfactory performance may possibly result and, even when a large amount exceeding 1.0% by mass is used, the effects thereof will reach at a point of substantial saturation and an economic disadvantage may possibly be entailed. More preferably, the addition level is not less than 0.0005% by mass, still more preferably not less than 0.001% by mass. It is more preferably not more than 0.5% by mass, still more preferably not more than 0.1% by mass. The above-mentioned compound may be incorporated at such a level and this addition causes various favorable effects, such as reduction in unit water content, increase in strength, and improvement in durability.

The polycarboxylic acid polymer to be incorporated in the concrete composition of the present invention may be any of those having free carboxyl groups and can produce a water reducing effect to cement composition and may comprise one or two or more species. Suited are, however, those polycarboxylic acid polymers which have polyalkylene glycol side chains. Such polycarboxylic acid polymers can be used as essential constituents in cement dispersants, and are called polycarboxylic acid cement dispersants or water reducing agents.

Preferred as the above-mentioned polycarboxylic acid polymers are polycarboxylic acid polymers (A-1) comprising a polyoxyalkylene ester constituent unit (I) represented by the following general formula (4):

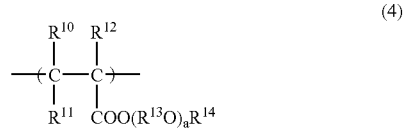

wherein $R^{10}$, $R^{11}$ and $R^{12}$ are the same or different and each represents a hydrogen atom or a methyl group, the $R^{13}O$ groups are the same or different and each represents an oxyalkylene group containing 2 to 18 carbon atoms, a represents the mean number of moles of the oxyalkylene group added and is a number of 2 to 300, and $R^{14}$ represents a hydrogen atom or a hydrocarbon group containing 1 to 30 carbon atoms, and a carboxylic acid constituent unit (II) represented by the following general formula (5):

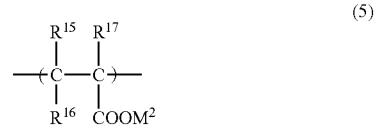

wherein $R^{15}$, $R^{16}$ and $R^{17}$ are the same or different and each represents a hydrogen atom or a methyl group, $M^2$ represents a hydrogen atom, a univalent metal, a bivalent metal, ammonium or an organic amine.

Also preferred as the polycarboxylic acid polymer are polycarboxylic acid polymers (A-2) comprising a polyoxyalkylene ether constituent unit (III) represented by the following general formula (6):

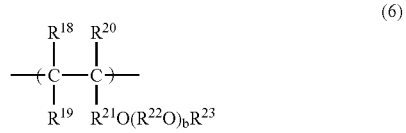

wherein $R^{18}$, $R^{19}$ and $R^{20}$ are the same or different and each represents a hydrogen atom or a methyl group, $R^{21}$ may be a hydrocarbon group containing 1 to 5 carbon atom(s) or the oxygen atom may be directly bound to the main chain of the polymer, the $R^{22}O$ groups are the same or different and each represents an oxyalkylene group containing 2 to 18 carbon atoms, b represents the mean number of moles of the oxyalkylene group added and is a number of 2 to 300, and $R^{23}$ represents a hydrogen atom or a hydrocarbon group containing 1 to 30 carbon atom(s), and a carboxylic acid constituent unit (IV) represented by the following general formula (7):

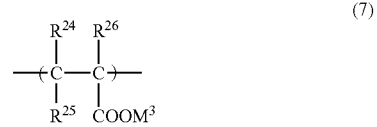

wherein $R^{24}$ and $R^{25}$ are the same or different and each represents a hydrogen atom, a methyl group or —COOM$^4$ with the exception of the case where $R^{24}$ and $R^{25}$ simultaneously represent —COOM$^4$; $R^{26}$ represents a hydrogen atom, a methyl group or —CH$_2$COOM$^5$ and, when $R^{26}$ is —CH$_2$COOM$^5$, $R^{24}$ and $R^{25}$ are the same or different and each represents a hydrogen atom or a methyl group; M$^3$, M$^4$ and M$^5$ each represents a hydrogen atom, a univalent metal, a bivalent metal, ammonium or an organic amine. Thus, the above-mentioned cement dispersant preferably comprises at least one of the above-mentioned polycarboxylic acid polymers (A-1) and/or at least one of the above-mentioned polycarboxylic acid polymer (A-2).

The above-mentioned polycarboxylic acid polymers (A-1) and (A-2) are characterized in that they have the essential constituent units (repeating units) specified above. They may further have a constituent unit (V) derived from a monomer (e) mentioned later herein. These constituent units each may comprise one species or two or more species.

The above-mentioned polycarboxylic acid polymers (A-1) can be produced by copolymerizing a monomer composition comprising a monomer giving a constituent unit (I) (e.g. monomer (a) mentioned later herein) and a monomer giving a constituent unit (II) (e.g. monomer (b) mentioned later herein) as essential constituents. Such a monomer composition may further contain a monomer giving a constituent unit (V) (e.g. monomer (e) mentioned later herein). When each constituent unit comprises one species, it is enough to use one single monomer species giving each respective constituent unit and, when each constituent unit comprises two or more species, two or more monomers giving each respective constituent unit are to be used.

The proportions of the constituent units constituting the above-mentioned polycarboxylic acid polymers (A-1) are preferably such that the mass ratio "constituent unit (I)/constituent unit (II)/constituent unit (V)" is equal to 1 to 99/99 to 1/0 to 50, more preferably 50 to 99/50 to 1/0 to 49, still more preferably 60 to 95/40 to 5/0 to 30, most preferably 70 to 95/30 to 5/0 to 10, with the proviso that the sum total of the constituent unit (I), constituent unit (II) and constituent unit (V) is 100% by mass.

The above-mentioned polycarboxylic acid polymers (A-1) may also be produced by direct esterification, with an alkoxypolyalkylene glycol, of at least part of the carboxyl groups of a polymer obtained by copolymerizing a monomer composition comprising, as essential constituents, an unsaturated monocarboxylic acid monomer, such as acrylic acid, methacrylic acid or crotonic acid, and a monomer (e.g. monomer (b) mentioned later herein) giving a constituent unit (II).

Referring to the above-mentioned general formula (4), the C$_{1-30}$ hydrocarbon group represented by $R^{14}$ includes, as suitable species, alkyl groups containing 1 to 30 carbon atom(s), benzene ring-containing aromatic groups containing 6 to 30 carbon atoms, such as phenyl, alkylphenyl, phenylalkyl, (alkyl)phenyl-substituted phenyl and naphthyl groups, and alkenyl groups containing 2 to 30 carbon atoms. The average number a of moles of the oxyalkylene group added is a number 2 to not more than 300, preferably not less than 5, more preferably not less than 10, still more preferably not less than 15, most preferably not less than 20. It is most preferably not more than 200. Furthermore, the number of carbon atoms contained in $R^{14}$ is not less than 1 but preferably not more than 22, more preferably not more than 18, still more preferably not more than 12, especially preferably not more than 6, further preferably not more than 5, most preferably not more than 3.

Referring to the general formula (4) given hereinabove, the number of carbon atoms in the oxyalkylene group $R^{13}$O is suitably 2 to 18, but preferably not more than 8, more preferably not more than 4. In cases when the constituent unit (I) comprises one species, it is preferred, for securing a balance between hydrophilicity and hydrophobicity, that the oxyalkylene group comprise the oxyethylene group as an essential constituent, more preferably with a content of not less than 50 mole percent, most preferably not less than 60 mole percent. In cases where the constituent unit (I) comprises two or more species, at least one constituent unit species (I) preferably contains the oxyethylene group as an essential constituent in oxyalkylene group species.

Suitable as the monomer (a) giving the above-mentioned constituent unit (I) are C$_{2-18}$ alkylene oxide adducts derived from (meth)acrylic acid, crotonic acid or a fatty acid dehydration (oxidation) product, and esterification products of (meth)acrylic acid or crotonic acid with alkoxypolyalkylene glycols obtained by addition of a C$_{2-18}$ alkylene oxide to any of saturated aliphatic alcohols containing 1 to 30 carbon atom(s), such as methanol, ethanol, 2-propanol, 1-butanol, 1-pentanol, 1-hexanol, octanol, 2-ethyl-1-hexanol, nonyl alcohol, lauryl alcohol, cetyl alcohol, stearyl alcohol, etc., unsaturated aliphatic alcohols containing 3 to 30 carbon atoms, such as allyl alcohol, methallyl alcohol, crotyl alcohol, oleyl alcohol, etc., alicyclic alcohols containing 3 to 30 carbon atoms, such as cyclohexanol, and aromatic alcohols containing 6 to 30 carbon atoms, such as phenol, phenylmethanol (benzyl alcohol), methylphenol (cresol), p-ethylphenol, dimethylphenol (xylenol), p-tert-butylphenol, nonylphenol, dodecylphenol, phenylphenol, naphthaol, etc. Preferred are, however, those ester compounds of alkoxypolyalkylene glycols corresponding to the cases where $R^{14}$ is a hydrocarbon group in general formula (4), with (meth) acrylic acid or crotonic acid.

Suitable as the above-mentioned monomer (a) includes the following, as given by specific chemical name: methoxypolyethylene glycol mono(meth)acrylate, ethoxypolyethylene glycol mono(meth)acrylate, 1-propoxypolyethylene glycol mono(meth)acrylate, 2-propoxypolyethylene glycol mono(meth)acrylate, 1-butoxypolyethylene glycol mono(meth)acrylate, 2-butoxypolyethylene glycol mono(meth)acrylate, 2-methyl-1-propoxypolyethylene glycol mono(meth)acrylate, 2-methyl-2-propoxypolyethylene glycol mono(meth)acrylate, 1-pentyloxypolyethylene glycol mono(meth)acrylate, 1-hexyloxypolyethylene glycol mono(meth)acrylate, cyclohexyloxypolyethylene glycol mono(meth)acrylate, 1-octyloxypolyethylene glycol mono(meth)acrylate, 2-ethyl-1-hexyloxypolyethylene glycol mono(meth)acrylate, nonylalkoxypolyethylene glycol mono(meth)acrylate, laurylalkoxypolyethylene glycol mono(meth)acrylate, cetylalkoxypolyethylene glycol mono(meth)acrylate, stearylalkoxypolyethylene glycol mono(meth)acrylate, phenoxypolyethylene glycol mono(meth)acrylate, phenylmethoxypolyethylene glycol mono(meth)acrylate, methylphenoxypolyethylene glycol mono(meth)acrylate, p-ethylphenoxypolyethylene glycol mono(meth)acrylate, dimethylphenoxypolyethylene glycol mono(meth)acrylate, p-tert-butylphenoxypolyethylene glycol mono(meth)acrylate, nonylphenoxypolyethylene glycol mono(meth)acrylate, dodecylphenoxypolyethylene glycol mono(meth)acrylate, phenylphenoxypolyethylene glycol mono(meth) acrylate, naphthoxypolyethylene glycol mono(meth) acrylate, esterification products derived from (meth)allyl alcohol-ethylene oxide adducts and (meth)acrylic acid, esterification products derived from crotyl alcohol-ethylene oxide adducts and (meth)acrylic acid, and various like alkoxypolyethylene glycol mono(meth)acrylates. Methoxypolyethylene-polypropylene glycol mono(meth)acrylate, methoxypolyethylene-polybutylene glycol mono(meth)acrylate, ethoxypolyethylene-polypropylene glycol mono(meth)acrylate, ethoxypolyethylene-polybutylene glycol mono(meth)acrylate, 1-propoxypolyethylene-polypropylene glycol mono(meth)acrylate, 1-propoxypolyethylene-polybutylene glycol mono(meth)acrylate, 2-propoxypolyethylene-polypropylene glycol mono(meth)acrylate, 2-propoxypolyethylene-polybutylene glycol mono(meth)acrylate, 1-butoxypolyethylene-polypropylene glycol mono(meth)acrylate, 1-butoxyethylne-polybutylene glycol mono(meth)acrylate, such esterification products as obtained from alcohols in which two or more alkylene oxide species with (meth)acrylic acid as esterification products derived from (meth)allyl alcohol-ethylene oxide/propylene oxide or ethylene oxide/butylene oxide adducts and (meth)acrylic acid, esterification products derived from crotyl alcohol-ethylene oxide/propylene oxide or ethylene oxide/butylene oxide adducts and (meth)acrylic acid, and like various alkoxypolyalkylene glycol mono(meth)acrylates.

Suitable as the metal atom $M^2$ in the above-mentioned general formula (5) are univalent metal atoms, for example alkali metal atoms such as lithium, sodium and potassium; bivalent metal atoms, for example alkaline earth metal atoms such as calcium and magnesium; and trivalent metal atoms such as aluminum and iron. Suitable as the organic amine group are alkanolamine groups such as an ethanolamine group, diethanolamine group and triethanolamine group, and a triethylamine group.

Suitable as the monomer (b) giving the constituent unit (II) represented by the above-mentioned general formula (5) are acrylic acid, methacrylic acid, crotonic acid, and metal salts, ammonium salts and amine salts of these. In particular, (meth)acrylic acid and salts thereof are preferred.

Also preferred as the polycarboxylic acid polymer to be used in the practice of the present invention are those copolymers (A-1) in which the constituent unit (I) represented by the general formula (4) is a constituent unit (I'), wherein $R_{10}$ and $R^{11}$ each is a hydrogen atom, $R^{13}O$ is an oxyalkylene group containing 2 to 4 carbon atoms and $R^{14}$ is a hydrocarbon group containing 4 to 30 carbon atoms, and the constituent unit (II) represented by the general formula (5) is a constituent unit (II'), wherein $R^{15}$ and $R^{16}$ each is a hydrogen atom. Thus, preferred as the above mentioned polycarboxylic acid polymer are those copolymers which comprise, as essential constituent units, a constituent unit (I') represented by the following general formula (1):

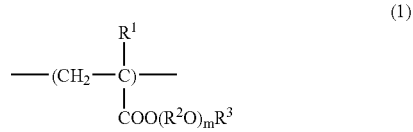

wherein $R^1$ represents a hydrogen atom or a methyl group, $R^2O$ represents an oxyalkylene group containing 2 to 4 carbon atoms, $R^3$ represents a hydrocarbon group containing 4 to 30 carbon atoms and m represents the number of moles of the oxyalkylene group added and is 2 to 300, and a constituent unit (II') represented by the following general formula (2):

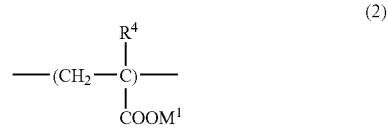

wherein $R^4$ represents a hydrogen atom or a methyl group and $M^1$ represents a hydrogen atom, a univalent metal, a bivalent metal, an ammonium group or an organic amine group. These copolymers have the above-mentioned essential constituent units (repeating units) and may further have a constituent unit (V) derived from another monomer (e) to be mentioned later herein.

$R^2O$ in the above-mentioned general formula (1) represents an oxyalkylene group containing 2 to 4 carbon atoms. The oxyalkylene group may comprise one species or two or more species. In cases when two or more species are involved, the mode of addition thereof may be of the random addition, block addition, or alternating addition type, for instance. In a preferred embodiment, oxyethylene groups are added to the site of bonding with the —COO— group. In cases when the constituent unit (I') comprises only one species, each oxyalkylene group moiety preferably includes the oxyethylene group as an essential constituent thereof, more preferably with an oxyethylene group content of not less than 50 mole percent, most preferably not less than 60 mole percent. On the other hand, when the constituent unit (I') comprises two or more species, it is preferred that at least one of the constituent unit species (I') contains the oxyethylene group in each oxyalkylene group moiety thereof.

The above-mentioned mean number m of moles added is 2 to 300. When it is less than 2, no sufficient hydrophilicity or steric hindrance for dispersing cement particles and so forth may be obtained in the concrete composition of form (2), for instance, hence the effects of the present invention may not be produced. When it exceeds 300, it may become difficult to produce the intended copolymer. As for its preferred range, m is preferably not less than 50. More preferably, it is not more than 200, still more preferably not more than 150, most preferably not more than 100. The average number of moles added means the average value of numbers of moles of the oxyalkylene group added in each mole of the constituent unit (I') represented by the general formula (1).

When the number of carbon atoms in the above-mentioned hydrocarbon group $R^3$ is less than 4, it will be impossible to provide the concrete composition of form (2), for instance, with a spacing factor value or specific surface value within the range specified hereinabove among the concrete values but large foams will form, possibly lowering the freeze-thaw durability. Further, when an AE agent and/or an defoaming agent is used in combination, the amount of air may possibly increase with the lapse of time. When it exceeds 30, the dispersing ability of cement particles and so forth may possibly decrease. The number of carbon atoms in the hydrocarbon group $R^3$ is preferably not more than 15, more preferably not more than 10, still more preferably not more than 8, especially preferably not more than 6, most preferably not more than 5.

Suitable as the above-mentioned hydrocarbon group containing 4 to 30 carbon atoms are alkyl groups containing 4 to 30 carbon atoms, benzene ring-containing aromatic groups containing 6 to 30 carbon atoms, such as phenyl, alkylphenyl, phenylalkyl, (alkyl)phenyl-substituted phenyl and naphthyl groups, and alkenyl groups containing 4 to 30 carbon atoms. Among the hydrocarbon groups, saturated alkyl groups and unsaturated alkyl groups are preferred. These alkyl groups may be straight or branched.

In the above-mentioned general formula (2), $M^1$ is the same as $M^2$ in the general formula (5).

The proportions of the respective constituent units constituting the above-mentioned polycarboxylic acid polymer, or the ratio (constituent unit (I')/constituent unit (II')/constituent unit V), are/is within the same range as the ratio "constituent unit (I)/constituent unit (II)/constituent unit (V)" for the polycarboxylic acid polymers (A-1) mentioned hereinabove. The abundances (mole proportions) of the constituent units (I) and (II) in such copolymer are preferably such that the sum of the constituent units (I') and (II') amount to not less than 50 mole percent, more preferably not less than 60 mole percent, relative to the all constituent units constituting the copolymer.

Among the monomers (a) mentioned above, those (meth) acrylate ester compounds derived from alkoxypolyalkylene glycols obtained by addition of an alkylene oxide(s) containing 2 to 4 carbon atoms to saturated aliphatic alcohols containing 4 to 30 carbon atoms, unsaturated aliphatic alcohols containing 4 to 30 carbon atoms, alicyclic alcohols containing 4 to 30 carbon atoms, or aromatic alcohols containing 6 to 30 carbon atoms are suitable as the monomer (a') giving the constituent unit (I') represented by the general formula (1) given above. Suitable as the monomer (b') giving the constituent unit (II') represented by the general formula (2) are the same ones as those suited as the monomer (b) mentioned above.

The polycarboxylic acid polymers (A-2) mentioned above can be prepared by copolymerizing a monomer composition comprising a monomer giving the constituent unit (III) (e.g. monomer (c) mentioned later herein) and a monomer giving the constituent unit (IV) (e.g. monomer (d) mentioned later herein) as essential constituents. Such monomer composition may further contain a monomer giving the constituent unit (V) (e.g. monomer (e) mentioned later herein).

The proportions of the constituent units constituting the above-mentioned polycarboxylic acid polymers (A-2) are preferably such that the mass ratio "constituent unit (III)/constituent unit (IV)/constituent unit (V)" is equal to 1 to 99/99 to 1/0 to 50, more preferably 50 to 99/50 to 1/0 to 49, still more preferably 60 to 95/40 to 5/0 to 30, most preferably 70 to 95/30 to 5/0 to 10, with the proviso that the sum total of the constituent units (III), (IV) and (V) is 100% by mass.

The above-mentioned polycarboxylic acid polymers (A-2) can also be prepared by adding 2 to 300 moles, on an average, of an alkylene oxide(s) to polymers obtained by copolymerizing a monomer composition comprising, as essential constituents, an unsaturated alcohol, such as allyl alcohol, methallyl alcohol, 3-methyl-3-buten-1-ol, 3-methyl-2-buten-1-ol or 2-methyl-3-buten-2-ol, and a monomer giving the constituent unit (IV) (e.g. monomer (d) mentioned later herein), or by reacting such polymers having an alkoxypolyalkylene glycol with an average moles of the oxyalkylene group added of 2 to 300.

Referring to the general formula (6) given above, the average number b of moles of the oxyalkylene group added is 2 to 300 but preferably is not less than 5, more preferably not less than 10, still more preferably not less than 20, most preferably not less than 25. It is most preferably not more than 200. The number of carbon atoms in $R^{23}$ is preferably not less than 1 but preferably not more than 22, more preferably not more than 18, still more preferably not more than 12, further preferably not more than 6, especially preferably not more than 5, most preferably not more than 3. The number of carbon atoms in $R^{21}$ is 1 to 5 but preferably not more than 4, more preferably not more than 3, and the structure $-CH_2-$, $-(CH_2)_2-$ or $-C(CH_3)_2-$ are most preferred.

The number of carbon atoms in the oxyalkylene group $R^{22}O$ in the general formula (6) given above is 2 to 18 but is preferably not more than 8, still more preferably not more than 4. In cases when the constituent unit (III) comprises one species, it is preferred, for securing a balance between hydrophilicity and hydrophobicity, that the oxyalkylene group comprise the oxyethylene group as an essential constituent, more preferably with a content of not less than 50 mole percent, most preferably not less than 60 mole percent.

The metal atom and organic amine group represented by $M^3$, $M^4$ or $M^5$ in the above-mentioned general formula (7) are as mentioned above-mentioned referring to $M^2$ in the general formula (5).

Suitable as the monomer (d) giving the constituent unit (IV) represented by the general formula (7) are unsaturated monocarboxylic acid monomers such as acrylic acid, methacrylic acid and crotonic acid, and metal salts, ammonium salts and amine salts of these; and unsaturated dicarboxylic acid monomers such as maleic acid, itaconic acid, citraconic acid and fumaric acid, and metal salts, ammonium salts and amine salts of these. The anhydrides of these may also be used and suitable examples thereof are maleic anhydride, itaconic anhydride and citraconic anhydride. Among them, those unsaturated monocarboxylic acid and like monomers in which $R^{24}$, $R^{25}$ and $R^{26}$ are the same or different and each is a hydrogen atom or a methyl group are preferably used, in particular (meth)acrylic acid, maleic acid, maleic anhydride, and salts of these are preferably used.

The monomer (e) capable of being used in the practice of the present present invention and giving the constituent unit (V) may be any of those copolymerizable with at least one of the other monomers and thus includes, as suitable species, the following: half esters and diesters derived from unsaturated dicarboxylic acids, such as maleic acid, fumaric acid, itaconic acid and citraconic acid, and alcohols containing 1 to 4 carbon atoms; half amides and diamides derived from the above-mentioned unsaturated dicarboxylic acids and amines containing 1 to 30 carbon atoms; half esters and diesters derived from the above-mentioned unsaturated dicarboxylic acids and alkyl(poly)alkylene glycols, which are adducts of 1 to 500 moles of an alkylene oxide(s) containing 2 to 18 carbon atoms with the above-mentioned alcohols or amines; half esters and diesters derived from the above-mentioned unsaturated dicarboxylic acids and glycols containing 2 to 18 carbon atoms or polyalkylene glycols, which are adducts of 2 to 300 moles of an alkylene oxide(s) with such glycols; half amides derived from maleamidic acid and glycols containing 2 to 18 carbon atoms or polyalkylene glycols, which are adducts of 2 to 300 moles of an alkylene oxide(s) with such glycols; (poly)alkylene glycol di(meth)acrylates such as triethylene glycol di(meth)acrylate, (poly)ethylene glycol di(meth)acrylate, polypropylene glycol di(meth)acrylate and (poly)ethylene glycol-(poly) propylene glycol di(meth)acrylate; difunctional (meth)acrylates such as hexanediol di(meth)acrylate, trimethylolpropane tri(meth)acrylate and trimethylolpropane di(meth) acrylate; (poly)alkylene glycol dimaleates such as triethylene glycol dimaleate and polyethylene glycol dimaleate; unsaturated sulfonic acids and monovalent metal salts, divalent metal salts, ammonium salts and organic amine salts thereof, for example vinylsulfonates, (meth)

allylsulfonates, 2-(meth)acryloxyethylsulfonates, 3-(meth) acryloxypropylsulfonates, 3-(meth)acryloxy-2-hydroxypropylsulfonates, 3-(meth)acryloxy-2-hydroxypropyl sulfophenyl ether, 3-(meth)acryloxy-2-hydroxypropyloxysulfobenzoates, 4-(meth)acryloxybutylsufonates, (meth) acrylamidomethylsulfonates, (meth)acrylamidoethylsulfonates, 2-methylpropanesulfonic acid (meth)acrylamide, and styrenesulfonic acid; unsaturated monocarboxylic acids such as acrylic acid, methacrylic acid and crotonic acid, and metal salts, ammonium salts and amine salts thereof.

Esters from unsaturated monocarboxylic acids and alcohols containing 1 to 4 carbon atom(s), for example methyl (meth)acrylate, ethyl (meth)acrylate, propyl (meth)acrylate, glycidyl (meth)acrylate, methyl crotonate, ethyl crotonate and propyl crotonate; amides derived from unsaturated monocarboxylic acids and amines containing 1 to 30 carbon atoms, for example methyl(meth)acrylamide; vinyl aromatics such as styrene, α-methylstyrene, vinyltoluene and p-methylstyrene; alkanediol mono(meth)acrylates such as 1,4-butanediolmono(meth)acrylate, 1,5-pentanediol mono (meth)acrylate and 1,6-hexanediol mono(meth)acrylate; dienes such as butadiene, isoprene, 2-methyl-1,3-butadiene and 2-chloro-1,3-butadiene; unsaturated amides such as (meth)acrylamide, (meth)acrylalkylamides, N-methylol (meth)acrylamide and N,N-dimethyl(meth)acrylamide; unsaturated cyano compounds such as (meth)acrylonitrile and α-chloroacrylonitrile; unsaturated esters such as vinyl acetate and vinyl propionate; unsaturated amines such as aminoethyl (meth)acrylate, methylaminoethyl (meth)acrylate, dimethylaminoethyl (meth)acrylate, dimethylaminopropyl (meth) acrylate, dibutylaminoethyl (meth)acrylate and vinylpyridine; divinyl aromatics such as divinylbenzene; cyanurates such as triallyl cyanurate; allyl compounds such as (meth)allyl alcohol and glycidyl (meth)allyl ether; unsaturated amino compounds such as dimethylaminoethyl (meth)acrylate; vinyl ethers or allyl ethers such as methoxypolyethylene glycol monovinyl ether, polyethylene glycol monovinyl ether, methoxypolyethylene glycol mono(meth) allyl ether and polyethylene glycol mono(meth)allyl ether.

Siloxane derivatives such as polydimethylsiloxanepropylaminomaleamidic acid, polydimethylsiloxaneaminopropyleneaminomaleamidic acid, polydimethylsiloxane-bis (propylaminomaleamidic acid), polydimethylsiloxane-bis (dipropyleneaminomaleamidic acid), polydimethylsiloxane-(1-propyl-3-acrylate), polydimethylsiloxane-(1-propyl-3-methacrylate), polydimethylsiloxane-bis(l-propyl-3-acrylate) and polydimethylsiloxane-bis(1-propyl-3-methacrylate); unsaturated phosphate esters such as 2-acryloyloxyethyl phosphate and 2-methacryloyloxyethyl phosphate.

Compounds derived, by addition of a specific amount of an alkylene oxide(s), from polyamidepolyamines prepared from condensation products, prepared in turn from polyalkylenepolyamines such as diethylenetriamine, triethylenetetramine, tetraethylenepentamine, pentaethylenehexamine, dipropylenetriamine, tripropylenetetramine and tetrapropylenepentamine and dibasic acids such as malonic acid, succinic acid, fumaric acid, maleic acid, azelaic acid or sebacic acid or esterification products obtained from such dibasic acids and alcohols containing 1 to 20 carbon atom(s) or condensation products from such dibasic acids and alcohols containing 1 to 20 carbon atom(s), by subjecting to further condensation, in specific proportions, with (meth) acrylic acid or an esterification product from (meth)acrylic acid and an alcohol containing 1 to 20 carbon atom(s), or glycidyl (meth)acrylate, allyl glycidyl ether or a like unsaturated epoxy compound; nitrogen-comprisining cationic monomers, for example condensation products derived from compounds resulting from addition of an alkylene oxide(s), such as ethylene oxide and propylene oxide, to an active hydrogen atom of a polyalkyleneimine, such as polyethyleneimine or polypropyleneimine, and (meth)acrylic acid or an esterification product from (meth)acrylic acid and an alcohol containing 1 to 20 carbon atom(s) or an unsaturated epoxy compound such as glycidyl (meth)acrylate or allyl glycidyl ether.

For obtaining the above-mentioned polycarboxylic acid polymer (A-1) or (A-2), the monomer composition mentioned above is polymerized using a polymerization initiator. The polymerization can be carried out in the manner of polymerization in a solvent or bulk polymerization, for instance. The polymerization in a solvent can be carried out by the batch method or by the continuous method. Suitable as the solvent to be used on that occasion are one or two or more species of water; lower alcohols such as methyl alcohol, ethyl alcohol and 2-propanol; aromatic or aliphatic hydrocarbons such as benzene, toluene, xylene, cyclohexane and n-hexane; ester compounds such as ethyl acetate; ketone compounds such as acetone and methyl ethyl ketone; and so forth. In view of the solubility of the starting monomer and of the product polycarboxylic acid polymer and in view of the ease of handling in using the polycarboxylic acid polymer, at least one species selected from the group consisting of water and lower alcohols containing 1 to 4 carbon atom(s) is preferably used. In that case, methyl alcohol, ethyl alcohol and 2-propanol are particularly effective among the lower alcohols containing 1 to 4 carbon atom(s).

In cases when the polymerization for producing the above-mentioned polycarboxylic acid polymer (A-1) or (A-2) is carried out in an aqueous medium, a water-soluble polymerization initiator, such as ammonium or alkali metal persulfate or hydrogen peroxide, is preferably used as a polymerization initiator. In this case, a promoter, such as sodium hydrogen sulfite, Mohr's salt, ascorbic acid (salt) or Rongalite, may be used combinedly. In carrying out the polymerization using a lower alcohol, an aromatic hydrocarbon, an aliphatic hydrocarbon, an ester compound or a ketone compound as the solvent, a peroxide such as benzoyl peroxide or lauroyl peroxide; a hydroperoxide such as cumene hydroperoxide; or an azo compound such as azobisisobutyronitrile, for instance, is preferably used as the polymerization initiator. In this case, it is also possible to use a promoter such as an amine compound combinedly. Furthermore, in cases when a water-lower alcohol mixed solvent is used, an appropriate polymerization initiator or polymerization initiator-promoter combination can be selected from among those various ones mentioned above. The polymerization can appropriately be selected according to the solvent and/or polymerization initiator employed. Generally, however, the polymerization is carried out at 0 to 120° C., preferably not less than 30° C., more preferably not less than 50° C. and preferably not more than 100° C., more preferably not more than 95° C.

When the polymerization is carried out in the manner of bulk polymerization, it is generally conducted at 50 to 200° C. using, as the polymerization initiator, a peroxide such as benzoyl peroxide or lauroyl peroxide; a hydroperoxide such as cumene hydroperoxide; or an azo compound such as azobisisobutyronitrile, and the like.

For adjusting the molecular weight of the product polycarboxylic acid polymer (A-1) or (A-2), a chain transfer agent, such as hypophosphorous acid (or a salt thereof) or a thiol can be used in combination. The thiol chain transfer agent to be used on that occasion is represented by the general formula HS-R$^{30}$-E$_g$ (wherein R$^{30}$ represents an alkyl group containing 1 or 2 carbon atom(s), E represents the group —OH, —COOM, —COOR$^{31}$ or SO$_3$M, M represents a hydrogen atom, a monovalent metal, a divalent metal, an ammonium group or a protonated organic amine group, R$^{31}$ represents an alkyl group containing 1 to 30 carbon atom(s) and g represents an integer of 1 or 2), and suitable are, for example, mercaptoethanol, thioglycerol, thioglycolic acid, 2-mercaptopropionic acid, 3-mercaptopropionic acid, thiomalic acid, octyl thioglycolate and octyl 3-mercaptopropionate. And thiol compounds containing not less than 3 carbon atoms but not having such a functional group as a hydroxyl group or carboxyl group may also be used as the chain transfer agent. Suitable as such compounds are butanethiol, octanethiol, decanethiol, dodecanethiol, hexadecanethiol, cyclohexylmercaptan, and thiophenol. Halogen-comprising compounds such as carbon tetrachloride, carbon tetrabromide, methylene chloride, bromoform and bromotrichloroethane as well as unsaturated hydrocarbon compounds such as α-methylstyrene dimer, α-terpinene, γ-terpinene and dipentene may also be used as the chain transfer agent. These may be used singly or in combination of two or more. It is also effective, in adjusting the molecular weight of the polycarboxylic acid polymer, to use a monomer having high chain transfer activity, such as (meth) allylsulfonic acid (salt), as the monomer (e).

While the above-mentioned polycarboxylic acid polymer (A-1) or (A-2) may be used as such, it is preferable, in cases when its solubility in water is insufficient, to use it in the form of a polymer salt obtained by further neutralization with an alkaline substance, for example such an inorganic material as the hydroxide, chloride or carbonate of a monovalent or divalent metal; ammonia; or a protonated organic amine (preferably a monovalent metal hydroxide such as sodium hydroxide or potassium hydroxide), so that the solubility in water may be improved and the polymer may be handled in the form of an organic solvent-free aqueous medium solution.

The above-mentioned polycarboxylic acid polymer (A-1) or (A-2) adequately has a weight average molecular weight of, for example, 5,000 to 1,000,000, preferably not more than 500,000, more preferably not less than 10,000 and more preferably not more than 300,000, as expressed in terms of polyethylene glycol equivalent as determined by gel permeation chromatography (hereinafter referred to as "GPC"). When the weight average molecular weight is less than 5,000, the ability to prevent material segregation may decrease. When it exceeds 1,000,000, the dispersing ability may decrease.

(Weight Average Molecular Weight Measurement Conditions)

Apparatus: Waters LCM1

Detector: Waters model 410 differential refractive index detector

Analyzing software: Waters MILLENNIUM Ver. 2.18

Eluent: The eluent to be used is prepared by dissolving 115.6 g of sodium acetate trihydrate in a mixture of 10,999 g of water and 6,001 g of acetonitrile and further adjusting the pH to 6.0 with a 30% aqueous solution of sodium hydroxide.

Eluent flow rate: 0.8 ml/min

Column temperature: 35° C.

Column: Tohso TSKgel Guard Column SWXL+ G4000SWXL+G3000SWXL+G2000SWXL

Standard substances: Polyethylene glycol species, weight average molecular weight (Mw): 272,500, 219,300, 85,000, 46,000, 24,000, 12,600, 4,250, 7,100, 1,470.

Polyoxyalkylene compounds having the carboxyl group on a side chain(s) thereof may be used as the above-mentioned polycarboxylic acid polymer in lieu of (A-1) or (A-2). Such polycarboxylic acid polymers can be obtained by subjecting an unsaturated carboxylic acid monomer to graft polymerization onto polyoxyalkylene compounds. Suitable as the polyoxyalkylene compounds are polyethylene glycol and polyoxyethylene-polyoxypropylene. Suitable as the unsaturated carboxylic acid monomer are unsaturated monocarboxylic acid monomers such as acrylic acid, methacrylic acid and crotonic acid, and metal salts, ammonium salts and amine salts thereof; and unsaturated dicarboxylic acid monomers such as maleic acid, itaconic acid, citraconic acid and fumaric acid, and metal salts, ammonium salts and amine salts thereof. Furthermore, the anhydrides of these, suitably maleic anhydride, itaconic anhydride and citraconic anhydride, may also be used. However, (meth)acrylic acid, maleic acid, maleic anhydride, and salts of these are preferably used among others.

The level of addition of the above-mentioned polycarboxylic acid polymer in the concrete composition of the present invention is preferably not less than 0.01% by mass but preferably not more than 5.0% by mass relative to the mass of cement. When the above-mentioned addition level is less than 0.01% by mass, no satisfactory performance may be obtained and, even when a large amount exceeding 5.0% by mass is used, the effects thereof reach a point of substantial saturation and an economic disadvantage may result. A more preferred addition level is not less than 0.02% by mass, still more preferably not less than 0.05% by mass, but preferably not more than 2.0% by mass, more preferably not more than 1.0% by mass. Thus, the polymer is to be added in an amount corresponding to such an addition level. This addition produces various favorable effects, such as reduction in unit water content, increase in strength and improvement in durability.

The other essential constituents or components in the concrete compositions of form (1) and form (2) according to the present invention are now described.

Suitable as the cement of the present invention are portland cement (ordinary, high-early-strength, ultra high-early-strength, moderate heat, sulfate resisting, and respective low alkali counterparts thereof), various kinds of mixed cement (portland blast-furnace slag cement, portland pozzolan cement, portland fly-ash cement), white portland cement, high alumina cement, ultra rapid hardening cement (1-clinker rapid hardening cement, 2-clinker rapid hardening cement, magnesium phosphate cement), grouting cement, oil-well cement, low-heat cement (low-heat blast-furnace slag cement, portland fly ash-mixed low-heat blast-furnace slag cement, high belite cement), ultra-high strength cement, cement-based solidifying agents, and eco cement (cement produced by using at least one species of municipal refuse incineration ash and sewage water sludge incineration ash as a raw material) and, further, blast-furnace slag, fly-ash, cinder ash, clinker ash, husk ash, silica fume, silica powders, limestone powers and like fine powders or gypsum may be added thereto. These may be used singly or in combination of two or more.

Sand is suitable as the fine aggregate to be used in the practice of the present invention. Usable as the coarse aggregate are gravel, crushed stone, water granulated iron-blast furnace slag, recycled concrete aggregate and the like and, in addition, fireproof aggregate materials such as silica stone, clay, zircon, high alumina, silicon carbide, graphite, chrome, chrome-magnesia and magnesia materials. These may be used singly or in combination of two or more.

As for the unit water content per cubic meter, the amount of cement to be used, the amount of coarse aggregate and the water/cement ratio in the concrete composition of the present invention, it is preferred that the unit water content be 100 to 185 kg/m$^3$, the unit cement content be 250 to 800 kg/m$^3$, the unit coarse aggregate content be 500 to 1,500 kg/m$^3$ and the water/cement ratio (mass ratio) be 0.1 to 0.7. The unit water content is more preferably not less than 120 kg/m$^3$ but not more than 175 kg/m$^3$. The unit cement content is more preferably not less than 270 kg/m$^3$ but not more than 800 kg/m$^3$. The unit coarse aggregate content is more preferably not less than 600 kg/m$^3$, still more preferably not less than 800 kg/m$^3$ while it is more preferably not more than 1,300 kg/m$^3$, still more preferably not more than 1,200 kg/m$^3$. The water/cement ratio (mass ratio) is more preferably not less than 0.15, still more preferably not less than 0.2 while it is more preferably not more than 0.65, still more preferably not more than 0.5. The concrete composition of the present invention can be used in a wide range of formulation, from lean or poor to rich mix, and thus may effectively take the form of high strength concrete with a high unit cement content or poor concrete with a unit cement content of 300 kg/m$^3$ or lower.

In the concrete composition of the present invention, there may also be incorporated, in addition to the constituents mentioned above, one or more of the conventional cement dispersants, defoaming agents, water-soluble polymers, air-entraining agents, cement wetting agents, swelling agent, water-proofer, retarders, quick setting accelerating agents, water-soluble polymeric substances, thickeners, flocculants, drying shrinkage reducing agents, strength increasing agents, accelerating admixtures, etc., within the range not interfering with the operation and result of the invention.

In the concrete admixture of the present invention, any of various AE agents, such as of the alkyl ether-based anionic surfactant, modified rosin acid compound-based anionic surfactant, alkylsulfonic acid compound-based anionic surfactant, higher alkylcarboxylic acid salt-based anionic surfactant and modified alkylcarboxylic acid compound-based anionic surfactant, for example Vinsol (trademark, product of Yamaso Kagaku) and Micro-Air (trademark, product of Master Builders), may be used combinedly, without reducing the effects of the present invention. Furthermore, other concrete admixtures such as cement dispersants other than those of polycarboxylic acid, shrinkage reducing agents, separation reducing agents, neutralization quick setting accelerating agents, accelerators, water-soluble polymers, thickening agents, flocculants, cement wetting agents, and corrosion inhibitors, may be used combinedly, without reducing the effects of the present invention.

When air of good quality is to be introduced into the concrete composition to thereby improve the freeze-thaw durability in the practice of the present invention, it is preferable to further add an AE agent to that composition. In that case, even when the kneading time is prolonged in the step of preparing the concrete composition, namely when the concrete composition is kneaded continuously for a prolonged period of time during transportation thereof, the content of entrained air in the above-mentioned concrete composition can be maintained stably to provide the curing products obtained therefrom with excellent freeze-thaw durability, strength and durability.

The cement composition of the present invention can be produced by a method of producing concrete compositions which comprises the step of blending together the raw materials including, as essential components, the defoaming agent (polyoxyalkylene compound), the polycarboxylic acid polymer, cement, water, fine aggregate and coarse aggregate when it is a concrete composition of form (1), or the raw materials, including, as essential components, the polycarboxylic acid polymer, cement, water, fine aggregate and coarse aggregate when it is a concrete composition of form (2). In this case, the methods and order of addition of the respective raw materials are not particularly restricted provided that all the raw materials constituting the concrete composition of the present invention are mixed up in that step. Such a method of producing concrete composition constitutes one of the preferred modes of embodiment of the present invention.

The concrete composition of form (2) according to the present invention has a spacing factor value of not more than 0.3 mm and shows an increase in air content of not more than 3% in the period of 5–15 minutes after the start of kneading.

When the concrete composition has a spacing factor value exceeding 0.3 mm and/or shows an increase in air content exceeding 3% in the period of 5–15 minutes after the start of kneading, the effects of the present invention can no more be fully produced.

The above-mentioned spacing factor value indicates the average foam-to-foam distance in the concrete composition. The spacing factor value is preferably not more than 0.28 mm but not less than 0.05 mm. More preferably, it is not more than 0.25 mm but not less than 0.1 mm.

The above-mentioned increase (%) in air content in the period of 5–15 minutes after the start of kneading means the difference $(V_3-V_1)$ (% by volume) where $V_1$ is the air content (% by volume) in concrete composition after 5 minutes of kneading at 20 rpm in producing the concrete composition by mixing/stirring the essential constituents thereof, namely the polycarboxylic acid polymer, cement, water, fine aggregate and coarse aggregate, together and $V_3$ is the air content (% by volume) after 15 minutes of kneading, with the time at which cement is added being taken as the start of kneading (minute zero). The air content in concrete composition is the volume percentage of air in concrete composition relative to the concrete composition. The increase in air content in the period of 5–15 minutes after the start of kneading is preferably not more than 2.5% (% by volume), more preferably not more than 2%.

The following is a suitable method for determining the increase in air content in the above-mentioned concrete composition.

(Method of Determining the Increase in Air Content)

Fine aggregate is charged into a mixer and, after 30 seconds of dry mixing, cement is added, followed by further 30 seconds of dry mixing. Water comprising a dispersant is added and, after 90 seconds of kneading, coarse aggregate is added, and the mixture is kneaded for 150 seconds. The slump value and air content are measured and are regarded as the slump value and air content $(V_1)$ (% by volume), respectively, at 5 minutes after the start of kneading. Thereafter, the concrete used for the measurements is returned to the mixer and again kneaded for 5 minutes. The slump value and air content are measured and are regarded as the slump value and air content $(V_2)$ (% by volume), respectively, at 10 minutes after the start of kneading. Again, the concrete after the measurements is returned to the mixer and, after further 5 minutes of kneading, the slump value and air content are measured and regarded as the slump value and air content ($V_3$) (% by volume), respectively, after 15 minutes of kneading.

The increase in air content is calculated according to the following formula:

Increase in air content (% by volume) in the period of 5–15 minutes after the start of kneading=Air content ($V_3$) (% by volume) at 15 minutes after the start of kneading–Air content ($V_1$) (% by volume) at 5 minutes after the start of kneading;

Increase in air content (% by volume) in the period of 5–10 minutes after the start of kneading=Air content ($V_2$) (% by volume) at 10 minutes after the start of kneading–Air content ($V_1$) (% by volume) at 5 minutes after the start of kneading;

In the practice of the present invention, it is preferable to confirm that the increase in air content in the concrete composition in the period of 5–15 minutes after the start of kneading is not more than 3% (% by volume).

In the above-mentioned concrete composition, the air content after 5 minutes of kneading is preferably within the range of not less than 4% by volume but not more than 10% by volume. When the air content exceeds 10% by volume, the strength will decrease and the desired strength may not be obtained. When that air content is less than 4% by volume, it becomes difficult to suppress the increase in air content in the period of 5–15 minutes after the start of kneading of the concrete composition to a level not higher than 3% and, further, the freeze-thaw durability may decrease. Preferably, it is not more than 8% by volume. The slump value is preferably within the range of not less than 15 cm to not more than 25 cm, more preferably within the range of 18 cm to 23 cm.

The above-mentioned concrete composition preferably shows a specific surface value of not less than 20 mm$^{-1}$. When this requirement is satisfied, the effects of the present invention can be produced to a fuller extent. The specific surface value is the ratio of the foam surface area to the foam volume; thus, the greater the specific surface value is, the smaller the foams are. More preferably, the specific surface value is not less than 22 mm$^{-1}$ but not more than 43 mm$^{-1}$. Still more preferably, it is not less than 25 mm$^{-1}$ but not more than 40 mm$^{-1}$.

In measuring the above-mentioned spacing factor value and specific surface value, the method described in ASTM C 457 or the measuring method using an air void analyzer (AVA) is judiciously used. According to the method described in ASTM C 457, the product of curing of the concrete composition is used as a sample. Thus, after removing the core from the curing product, a specimen is prepared by such operations as cutting and polishing, and the specimen is subjected to measurement by the linear traverse method using a microscope. According to the method using an AVA, the measurement is carried out using the concrete composition before curing; it is considered that the method gives substantially the same results as the spacing factor value and specific surface value measured by the method according to ASTM C 457. Thus, it is possible to estimate the quality of foams in the curing product obtained from the said concrete composition using the concrete composition before curing. In the practice of the present invention, the measurement method using an AVA is judiciously applied since the measurements can be carried out in a simple and easy manner and rapidly.

Applicable as the measurement method using an AVA is the method described in International Symposium: Non-Destructive Testing in Civil Engineering (NDT-CE) 26.28.09 (1995), Berlin, for instance.

A column constituting an AVA, which is to be used in the measurement, is schematically shown in FIG. 1. The column is filled with a liquid having a specified viscosity and hydrophobicity (hereinafter referred to as "viscous liquid") and with water. On the column bottom, there is a viscous liquid phase, and a water phase is formed above it. The water phase and viscous liquid phase are in contact with each other, forming an interface between them.

The principle of measurement with an AVA and the measurement method are now described. The concrete composition prior to curing is used as a sample. The spacing factor value and specific surface value can be calculated using the software attached to Dansk Beton Teknik's DBT Air Void Analyzer.

(1) Aggregate fraction 6 mm or larger in size are removed from the concrete composition.

(2) Using a syringe, 20 cm$^3$ of the mortar (cement paste) after removal of the aggregate fraction mentioned above is collected as a sample and poured onto the bottom of the AVA column shown in FIG. 1. A mixture of glycerol and water, for instance, is suited for use as the viscous liquid.

(3) The mortar is stirred gently for 30 seconds. When the mortar is dispersed in the viscous liquid, the air entrained into the fresh concrete by the air entraining agent form bubbles in the viscous liquid from the column bottom. Owing to the characteristics of the viscous liquid, the bubbles in the mortar are released as a large number of fine foams while retaining their sizes and volumes in the mortar without adhesion or disintegration. The bubbles released rise in the viscous liquid at their respective size-dependent rates according to Stokes' law and enter the water phase occurring on the viscous liquid phase.

(4) After rising through the water phase, the bubbles are collected below a bowl disposed at the top of the analyzer. This bowl is equipped with a scale, and the buoyancy of the bowl is recorded as a function of time by means of a computer connected to the scale. The specific surface value can be determined based on the relationship between bowl buoyancy and time in accordance with certain standards.

(5) The measurement is continued for 25 minutes. This is the time supposedly required for obtaining the same level of accuracy as the foam parameters obtainable according to ASTM C 457. In the early stage of measurement, the bubbles arriving at below the bowl show a size distribution of several micrometers to several millimeters, and the size distribution becomes narrow with the lapse of time.

(6) The system of the AVA calculates the air content and spacing factor value using the amount of the cement paste used for the measurement and the formulation of the concrete composition.

The present invention is further concerned with a method of producing concrete compositions which comprises adding an defoaming agent comprising a compound having at least one nitrogen atom within the molecule, together with a water reducing agent and an air entraining agent.

In accordance with such method of producing concrete compositions, the bubbles formed by the water reducing agent can effectively be reduced or eliminated by the defoaming agent comprising a compound having at least one nitrogen atom within the molecule, while fine foam can be brought about by the air entraining agent. Thus, it becomes possible to produce concrete compositions excellent in the quality of foam.

In the above-mentioned method of producing concrete compositions, the defoaming agent comprising a compound having at least one nitrogen atom within the molecule, the water reducing agent and the air entraining agent each may comprise one species or a combination of two or more species.

Suited for use as the above-mentioned defoaming agent comprising a compound having at least one nitrogen atom within the molecule are those polyoxyalkylene compounds mentioned hereinabove. When such polyoxyalkylene compounds are used, the defoaming agent addition level is preferably the same as mentioned hereinabove.

Suitable as the above-mentioned water reducing agent are those polycarboxylic acid polymers mentioned hereinabove. Also usable are naphthalenesulfonic acid compounds, ligninsulfonic acid compounds, melaminesulfonic acid compounds and the like. When those polycarboxylic acid polymers are used, the addition level is the same as mentioned hereinabove.

Suitable as the above-mentioned air entraining agent are those surfactant type AE agents mentioned hereinabove. The level of addition thereof is preferably not less than 0.001% by mass but not more than 5% by mass, relative to the mass of cement. More preferably, it is not less than 0.01% by mass but not more than 1% by mass. Still more preferably, it is not less than 0.02% by mass but not more than 0.5% by mass.

In the method of producing concrete compositions according to the present invention, the methods and order of addition of the respective raw materials are not particularly restricted provided that the step of mixing up all the raw materials constituting the concrete composition, namely the defoaming agent comprising a compound having at least one nitrogen atom within the molecule, the water reducing agent, the air entraining agent, cement, water, fine aggregate and coarse aggregate, is included therein.

The present invention is also concerned with a cement admixture comprising a polyoxyalkylene compound having at least one nitrogen atom within the molecule and having an oxyethylene group or groups and an oxyalkylene group or groups containing not less than 3 carbon atoms and further having an aliphatic hydrocarbon structure containing at least 5 consecutively bound carbon atoms, with the polyoxyalkylene compound satisfying the relation $0.1<u/(u+v)<0.55$ where u is the total number of moles of the oxyethylene group added and v is the total number of moles of the oxyalkylene group(s) containing not less than 3 carbon atoms as added.

Those polyoxyalkylene compounds mentioned hereinabove are suitable as the above-mentioned polyoxyalkylene compound, and one or two or more of them may be used. Preferred forms of such polyoxyalkylene compounds are those polyoxyalkylene compounds represented by the general formula (3) in which the relation $0.1<u/(u+v)<0.55$ is satisfied. Those polyoxyalkylene compounds which satisfy the relation $0.15<u/(u+v)\leq0.5$ are further preferred. By using such compounds, the effects of the present invention can be produced to a fuller extent.

The content of the polyoxyalkylene compound in the cement admixture according to the present invention is preferably not less than 1% by mass but not more than 20% by mass, more preferably not less than 5% by mass but not more than 10% by mass, relative to 100% by mass of the cement admixture.

The cement admixture of the present invention, which comprises the above-mentioned polyoxyalkylene compound, can exhibit excellent defoaming performance and, accordingly, can judiciously be used in such cement compositions as cement paste, mortar and concrete. It will not allow the air content to increase with the prolongation of the period of kneading but can stably maintain the content of entrained air.

Figure 1:
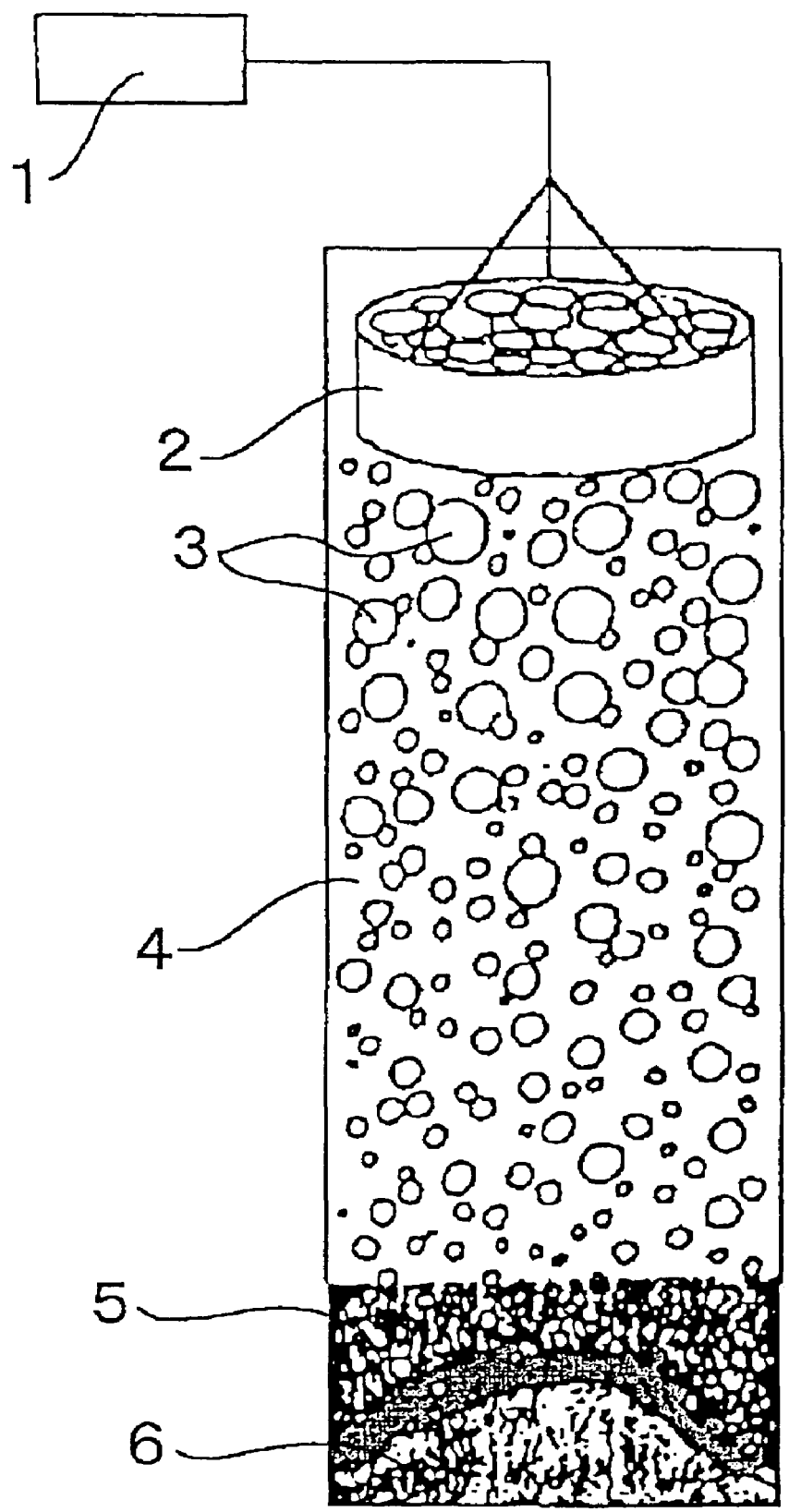
FIG. 1 is a schematic illustration of the principle of an air void analyzer (AVA) to be used in measuring the spacing factor value and specific surface value.

In the FIGURE, 1 stands for a scale or balance (buoyancy recorder), 2 for a bowl, 3 for a bubble, 4 for a water phase, 5 for a viscous liquid phase, and 6 for a cement paste.

BEST MODE FOR CARRYING OUT THE INVENTION

The following examples illustrate the present invention in further detail. They are, however, by no means limitative of the scope of the present invention. Unless otherwise indicated, "%" means "% by mass".

PRODUCTION EXAMPLE 1

A glass reaction vessel equipped with a thermometer, stirrer, dropping funnel, nitrogen inlet tube and reflux condenser was charged with 339.6 g of water, the reaction vessel inside atmosphere was substituted with nitrogen with stirring, and the charge was heated to 80° C. in a nitrogen atmosphere. Then, a monomer-comprising aqueous medium (503.5 g) composed of 333.6 g of methoxypolyethylene glycol monomethacrylate (average number of moles of ethylene oxide added: 25), 66.4 g of methacrylic acid, 100 g of water and 3.5 g of 3-mercaptopropionic acid as a chain transfer agent was added dropwise over 4 hours and, in parallel, an aqueous solution (46 g) comprising 4.6 g of ammonium peroxodisulfate was added dropwise over 5 hours. Thereafter, the temperature was further maintained at 80° C. for 1 hour to drive the polymerization reaction to completion, whereby a copolymer (1) with a weight average molecular weight of 23,800 was obtained in the form of an aqueous medium solution comprising the copolymer.

The structures of the defoaming agents used in Examples 1 to 3 and Comparative Examples 1 and 2 are shown below. Each has a basic structure resulting from addition of ethylene oxide and propylene oxide to an amine or alcohol. Here, EO represents ethylene oxide, and PO propylene oxide. RaN is a hydrogenated beef tallow amine residue containing 14–18 carbon atoms (total amine value=215.9). RbO is a secondary alcohol residue containing 12–14 carbon atoms.

(Defoaming agent 1) $C_{12}H_{25}N(EO)_7(PO)_5H$
(Defoaming agent 2) $C_{12}H_{25}N(EO)_7(PO)_7H$
(Defoaming agent 3) $RaN(EO)_7(PO)_7H$
(Comparative defoaming agent 1) $C_8H_{17}O(PO)_{20}(EO)_3H$
(Comparative defoaming agent 2) $RbO(EO)_9(PO)_5H$ Examples 1 to 3 and Comparative Examples 1 and 2

<Concrete Test>

In the concrete test, the aqueous solution of copolymer (1) as obtained in Production Example 1 was adjusted to pH 7 with an aqueous solution of sodium hydroxide with a concentration of 30%, and further adjusted to a solid concentration of 40% by dilution with deionized water.

Ordinary portland cement (product of Taiheiyo Cement Corp.; specific gravity 3.16) was used as cement, land sand (specific gravity 2.62) originated in the Oi river system as fine aggregate, crushed stone (specific gravity 2.58) originating in Ome as coarse aggregate, and Yokosuka City water as water. According to either of the two formulations given below, the respective materials were weighed to give a mixing volume of 40 L and kneaded together using a tilting mixer (product of Koyo Kikai Sangyo; KYC Baby Mixer). The number of revolutions of the mixer was fixed at 20 revolutions per minute (rpm).

<Formulation 1>
Unit cement content: 360.0 kg/m$^3$
Unit water content: 144.0 kg/m$^3$ (5) A portion of the resulting concrete was taken out of the mixer for slump and air content measurements. The slump measurement was carried out according to the Japanese Industrial Standard JIS A 1101, and the air content measurement according to the Japanese Industrial Standard JIS A 1128. The slump value at this point of time was recorded as S1, and the air content as A1.

(6) That portion of the concrete used for slump and air content measurements was returned to the mixer and, after 5 minutes of further kneading, the slump and air content were again measured. The slump value at this point of time was recorded as S2, and the air content as A2.

(7) The portion of the concrete used for the measurements was again returned to the mixer, and kneading was conducted for 5 minutes. The concrete obtained was measured for slump and air content. The slump value at this point of time was recorded as S3, and the air content as A3.

The results of this concrete test are summarized in Table 1.

TABLE 1

| | | Example 1 | | | Example 2 | | | Example 3 | | | Comparative Example 1 | | | Comparative Example 2 | | |
|---|---|---|---|---|---|---|---|---|---|---|---|---|---|---|---|---|
| | | Formulation | | | | | | | | | | | | | | |
| | | 1 | | | 1 | | | 2 | | | 1 | | | 1 | | |
| Plasticizer | Species | Copolymer(1) | | | Copolymer(1) | | | Copolymer(1) | | | Copolymer(1) | | | Copolymer(1) | | |
| | Addition level (mass %/C) | 0.18 | | | 0.18 | | | 0.16 | | | 0.18 | | | 0.18 | | |
| Defoaming agent | Species | Defoaming agent(1) | | | Defoaming agent(3) | | | Defoaming agent(2) | | | Comparative defoaming agent(1) | | | Comparative defoaming agent(2) | | |
| | Addition level (mass %/plasticizer solids) | 5 | | | 5 | | | 5 | | | 0.5 | | | 3 | | |
| AE agent | Species | Micro-Air | | | Micro-Air | | | Micro-Air | | | Micro-Air | | | Micro-Air | | |
| | Addition level (mass %/C) | 0.03 | | | 0.03 | | | 0.12 | | | 0.03 | | | 0.03 | | |
| Result | | S1 | S2 | S3 | S1 | S2 | S3 | S1 | S2 | S3 | S1 | S2 | S3 | S1 | S2 | S3 |
| | Slump(cm) | 17.5 | 9.5 | 3 | 22 | 19 | 3 | 23 | 20 | 8 | 17 | 19 | 10.5 | 16 | 6 | 2 |
| | | A1 | A2 | A3 | A1 | A2 | A3 | A1 | A2 | A3 | A1 | A2 | A3 | A1 | A2 | A3 |
| | Air content(%) | 4.3 | 4.8 | 4.8 | 6 | 6.5 | 4.5 | 8.2 | 7 | 5.7 | 3.1 | 8.4 | 12 | 4.4 | 4.1 | 4.1 |

Unit fine aggregate content: 767.1 kg/m$^3$
Unit coarse aggregate content: 1043.1 kg/m$^3$
Water/Cement ratio: 40%
Fine aggregate ratio: 42%

<Formulation 2>
Unit cement content: 350.0 kg/m$^3$
Unit water content: 161.0 kg/m$^3$
Unit fine aggregate content: 877.1 kg/m$^3$
Unit coarse aggregate content: 899.0 kg/m$^3$
Water/Cement ratio: 46%
Fine aggregate ratio: 49%

<Method of Kneading>
(1) The mixer was charged with the fine aggregate alone and, after 30 seconds of dry mixing, the rotation was stopped.
(2) Cement was added, and dry mixing was carried out for further 30 seconds.
(3) The rotation was stopped, water (95% of the specified total amount of water) comprising the water reducing agent and defoaming agent was added, and kneading was further carried out for 90 seconds.
(4) The rotation was again stopped, the coarse aggregate was added, water (5% of the specified total amount of water) comprising the AE agent was added, and kneading was carried out for 150 seconds.

Remarks are made referring to Table 1. The AE agent "Micro-Air" (trademark) is an AE agent produced by Master Builders. The addition level (% by mass/C) is in percent by mass relative to cement solids. The air content (%) is in percent by volume in the concrete composition.

PRODUCTION EXAMPLE 2

A glass reaction vessel equipped with a thermometer, stirrer, dropping funnel, nitrogen inlet tube and reflux condenser was charged with 661.5 g of water, the reaction vessel inside atmosphere was substituted with nitrogen with stirring, and the charge was heated to 70° C. in a nitrogen atmosphere. Then, an aqueous monomer solution composed of 711.2 g of methoxypolyethylene glycol monomethacrylate (average number of moles of ethylene oxide added: 10), 188.8 g of methacrylic acid, 225 g of water and 12.0 g of 3-mercaptopropionic acid as a chain transfer agent was added dropwise to the reaction vessel over 4 hours and, in parallel, 200 g of a 5.2% aqueous solution of ammonium persulfate was added dropwise over 5 hours. After completion of the dropping of the 5.2% aqueous solution of ammonium persulfate, the temperature was further maintained at 70° C. for 1 hour to drive the polymerization reaction to completion, followed by neutralization to pH 7.0 with a 30% aqueous solution of sodium hydroxide to give a copolymer (2) with a weight average molecular weight of 17,000 was obtained in the form of an aqueous medium solution comprising the copolymer.

EXAMPLES 4 to 19

The structures of the copolymer (3) and the defoaming agents used in Examples 4 to 19 are shown below. Each has a basic structure resulting from addition of ethylene oxide and propylene oxide to an amine. Here, EO represents ethylene oxide, and PO propylene oxide. RaN is a hydrogenated beef tallow amine residue containing 14 to 18 carbon atoms (total amine value=215.9).

(Copolymer (3))
Copolymer of polyethylene glycol mono(3-methyl-3-buthenyl) ether (average number of moles of ethylene oxide added: 50) and sodium acrylate in a mass ratio of 85/15; weight average molecular weight 35,000

(Defoaming agent 4) $C_{12}H_{25}N(EO)_4(PO)_8H$
(Defoaming agent 5) $C_{12}H_{25}N(EO)_6(PO)_{12}H$
(Defoaming agent 6) $C_{12}H_{25}N(PO)_6(EO)_2H$
(Defoaming agent 7) $RaN(EO)_2(PO)_6H$
(Defoaming agent 8) $RaN(EO)_3(PO)_6H$
(Defoaming agent 9) $RaN(EO)_4(PO)_8H$
(Defoaming agent 10) $RaN(EO)_6(PO)_{12}H$
(Defoaming agent 11) $RaN(EO)_8(PO)_{16}H$
(Defoaming agent 12) $RaN(PO)_6(EO)_2H$
(Defoaming agent 13) $RaN(PO)_6(EO)_{1.5}H$
(Defoaming agent 14) $RaN(PO)_6(EO)_1H$
(Defoaming agent 15) $RaN(PO)_9(EO)_3H$
(Defoaming agent 16) $RaN(PO)_{12}(EO)_4H$ The concrete test method was the same as mentioned above.

The test results are summarized in Table 2 and Table 3. The same remarks as made referring to Table 1 may be made referring to Table 2 and Table 3 as well.

TABLE 2

|  | Example 4 | Example 5 | Example 6 | Example 7 | Example 8 |
|---|---|---|---|---|---|
| Formulation | 2 | 2 | 2 | 2 | 2 |
| Plasticizer |  |  |  |  |  |
| Species | Copolymer(1) | Copolymer(1) | Copolymer(1) | Copolymer(1) | Copolymer(1) |
| Addition level (mass %/C.) | 0.16 | 0.16 | 0.16 | 0.16 | 0.16 |
| Defoaming agent |  |  |  |  |  |
| Species | Defoaming agent(4) | Defoaming agent(4) | Defoaming agent(5) | Defoaming agent(6) | Defoaming agent(7) |
| Addition level (mass %/plasticizer solids) | 5 | 10 | 5 | 5 | 5 |
| AE agent |  |  |  |  |  |
| Species | Micro-Air | Micro-Air | Micro-Air | Micro-Air | Micro-Air |
| Addition level (mass %/C.) | 0.03 | 0.03 | 0.03 | 0.03 | 0.03 |
| Result |  |  |  |  |  |
|  | S1 S2 S3 | S1 S2 S3 | S1 S2 S3 | S1 S2 S3 | S1 S2 S3 |
| Slump(cm) | 22 16 10 | 22 13 4.5 | 19.5 12 5 | 17 5 3 | 20 9 5 |
|  | A1 A2 A3 | A1 A2 A3 | A1 A2 A3 | A1 A2 A3 | A1 A2 A3 |
| Air content(%) | 6.8 7.8 6.7 | 3.5 4 3.8 | 5.9 6 5 | 2.3 3.4 4 | 1.5 2.7 3.6 |

|  | Example 9 | Example 10 | Example 11 |
|---|---|---|---|
| Formulation | 2 | 2 | 2 |
| Plasticizer |  |  |  |
| Species | Copolymer(1) | Copolymer(1) | Copolymer(1) |
| Addition level (mass %/C.) | 0.16 | 0.16 | 0.16 |
| Defoaming agent |  |  |  |
| Species | Defoaming agent (8) | Defoaming agent(9) | Defoaming agent(10) |
| Addition level (mass %/plasticizer solids) | 5 | 5 | 5 |
| AE agent |  |  |  |
| Species | Micro-Air | Micro-Air | Micro-Air |
| Addition level (mass %/C.) | 0.03 | 0.03 | 0.03 |

TABLE 2-continued

Result

|  | S1 | S2 | S3 | S1 | S2 | S3 | S1 | S2 | S3 |
|---|---|---|---|---|---|---|---|---|---|
| Slump(cm) | 24 | 22 | 15 | 22.5 | 18 | 9 | 23.5 | 22.5 | 17.5 |
|  | A1 | A2 | A3 | A1 | A2 | A3 | A1 | A2 | A3 |
| Air content(%) | 5.7 | 8 | 6.8 | 7.1 | 7.5 | 7 | 7 | 8.4 | 8 |

TABLE 3

|  | Example 12 | Example 13 | Example 14 | Example 15 | Example 16 |
|---|---|---|---|---|---|
| Formulation | 2 | 2 | 2 | 2 | 2 |
| Plasticizer |  |  |  |  |  |
| Species | Copolymer(1) | Copolymer(1) | Copolymer(1) | Copolymer(1) | Copolymer(1) |
| Addition level (mass %/C.) | 0.16 | 0.16 | 0.16 | 0.16 | 0.16 |
| Defoaming agent |  |  |  |  |  |
| Species | Defoaming agent(11) | Defoaming agent(12) | Defoaming agent(13) | Defoaming agent(14) | Defoaming agent(15) |
| Addition level (mass %/plasticizer solids) | 5 | 5 | 5 | 5 | 5 |
| AE agent |  |  |  |  |  |
| Species | Micro-Air | Micro-Air | Micro-Air | Micro-Air | Micro-Air |
| Addition level (mass %/C.) | 0.03 | 0.03 | 0.03 | 0.03 | 0.03 |
| Result |  |  |  |  |  |

| | S1 | S2 | S3 | S1 | S2 | S3 | S1 | S2 | S3 | S1 | S2 | S3 | S1 | S2 | S3 |
|---|---|---|---|---|---|---|---|---|---|---|---|---|---|---|---|
| Slump(cm) | 22 | 18 | 11 | 19 | 10.5 | 5 | 17 | 6 | 3.5 | 20 | 8 | 5 | 23 | 16.5 | 13.5 |
|  | A1 | A2 | A3 | A1 | A2 | A3 | A1 | A2 | A3 | A1 | A2 | A3 | A1 | A2 | A3 |
| Air content(%) | 7 | 7 | 6.8 | 7 | 7 | 6.8 | 2.2 | 2.9 | 4 | 1.9 | 3 | 3.8 | 8 | 6.6 | 6.6 |

|  | Example 17 | Example 18 | Example 19 |
|---|---|---|---|
| Formulation | 2 | 2 | 2 |
| Plasticizer |  |  |  |
| Species | Copolymer(1) | Copolymer(2) | Copolymer(3) |
| Addition level (mass %/C.) | 0.16 | 0.17 | 0.16 |
| Defoaming agent |  |  |  |
| Species | Defoaming agent(16) | Defoaming agent(4) | Defoaming agent(12) |
| Addition level (mass %/plasticizer solids) | 5 | 7.5 | 5 |
| AE agent |  |  |  |
| Species | Micro-Air | Micro-Air | Micro-Air |
| Addition level (mass %/C.) | 0.03 | 0.03 | 0.03 |
| Result |  |  |  |

| | S1 | S2 | S3 | S1 | S2 | S3 | S1 | S2 | S3 |
|---|---|---|---|---|---|---|---|---|---|
| Slump(cm) | 21 | 13 | 5.5 | 21.5 | 19 | 14.5 | 23.5 | 20.5 | 7.5 |
|  | A1 | A2 | A3 | A1 | A2 | A3 | A1 | A2 | A3 |
| Air content(%) | 8.4 | 6.5 | 6.3 | 4.2 | 5.5 | 5.2 | 8 | 6.1 | 5.5 |

<Test for the Compatibility with the Admixture>

A specified amount of each of the defoaming agents (1) to (3) was added to an aqueous solution of copolymer (1), the pH was adjusted with an aqueous sodium hydroxide solution and, further, the solids content was adjusted to 40% with deionized water. Each aqueous solution obtained was first observed for appearance at room temperature, then allowed to stand in a constant temperature room maintained at 43° C. and, after 1 day and after 6 months, observed for appearance.

In the case of Comparative defoaming agents (1) and (2), a specified amount of each was added to an aqueous solution prepared by adjusting the aqueous solution of copolymer (1)

to pH 7 with sodium hydroxide. The solids content was adjusted to 40% with deionized water, and the resulting aqueous solution was subjected to the same observation procedure as mentioned above.

The results are summarized in Table 4.

(Criteria for Appearance Evaluation)
◎: Uniform and transparent
Δ: Turbid
×: Layer separation according to the Japanese Industrial Standards (JIS A 1101 and JIS A 1128). The number of revolutions of the mixer was fixed at 20 rpm.

<Method of Kneading in the Concrete Test>
(1) The mixer was charged with the fine aggregate alone, and dry mixing was carried out for 30 seconds.
(2) The rotation was stopped, cement was then added, and dry mixing was carried out for further 30 seconds.

TABLE 4

| Agent | Structure | Solid content (%) | Defoaming agent addition level (mass %/plasticizer solids) | pH of adjusted aqueous solution | Appearance at room temperature | Appearance after 1 day at 43° C. | Appearance after 6 months at 43° C. |
|---|---|---|---|---|---|---|---|
| Defoaming agent(1) | $C_{12}H_{25}N(EO)_7(PO)_5H$ | 40 | 4.5 | 6 | ◎ | ◎ | ◎ |
| Defoaming agent(2) | $C_{12}H_{25}N(EO)_7(PO)_7H$ | 40 | 5 | 6 | ◎ | ◎ | — |
| Defoaming agent(3) | $RaN(EO)_7(PO)_7H$ | 40 | 5 | 6 | ◎ | ◎ | — |
| Comparative defoaming agent(1) | $C_8H_{17}O(PO)_{20}(EO)_3H$ | 40 | 0.5 | 7 | × | — | — |
| Comparative defoaming agent(2) | $RbO(EO)_9(PO)_5H$ | 40 | 4.5 | 7 | Δ | × | — |

Remarks are made referring to Table 4 in the following. As for the defoaming agent structure, RaN is a hydrogenated beef tallow amine residue containing 14 to 18 carbon atoms (total amine value=215.9), and RbO is a secondary alcohol residue containing 12 to 14 carbon atoms. The solids content (%) is the content, in percent by mass, of the solids in the aqueous solution.

PRODUCTION EXAMPLE 3

A glass reaction vessel equipped with a thermometer, stirrer, dropping funnel, nitrogen inlet tube and reflux condenser was charged with 1242.1 g of water, the reaction vessel inside atmosphere was substituted with nitrogen with stirring, and the charge was heated to 80° C. in a nitrogen atmosphere. Then, an aqueous monomer solution (738.1 g) composed of 404.2 g of 1-butoxypolyethylene glycol monomethacrylate (average number of moles of ethylene oxide added: 75), 35.8 g of methacrylic acid, 293.6 g of water and 4.5 g of 3-mercaptopropionic acid as a chain transfer agent was added dropwise over 4 hours and, in parallel, an aqueous solution (220 g) comprising 5.1 g of ammonium peroxodisulfate was added dropwise over 5 hours. Thereafter, the temperature was further maintained at 80° C. for 1 hour to drive the polymerization reaction to completion, whereby an aqueous solution comprising a copolymer (4) with a weight average molecular weight of 41,100 was obtained.

EXAMPLE 20 AND COMPARATIVE EXAMPLE 3

<Concrete Test>

The same cement, fine aggregate and coarse aggregate as mentioned hereinabove were used. According to the formulation 2 given above, a concrete composition was produced in a mixing volume of 40 L and subjected to slump value and air content measurements. A tilting mixer (product of Koyo Kikai Sangyo; KYC Baby Mixer) was used in kneading the concrete, and the slump value and air content were measured (3) The rotation was stopped, water comprising the dispersing agent (aqueous solution of copolymer (1) or copolymer (4); copolymer concentration 0.35% by mass) was added, and kneading was carried out for 90 seconds.
(4) The rotation was again stopped, the coarse aggregate was added, and kneading was carried out for 150 seconds.
(5) The slump and air content were measured. The values at that point of time were recorded as the slump value and air content ($V_1$) (% by volume) at 5 minutes after the start of kneading.
(6) After completion of the measurements, the concrete used for the measurements was returned to the mixer, and kneading was carried out again for 5 minutes.
(7) The slump value and air content were measured, and the values at that point of time were recorded as the slump value and air content ($V_2$) (% by volume) at 10 minutes after the start of kneading.
(8) The concrete used for the measurements was again returned to the mixer, and kneading was further conducted for 5 minutes.
(9) The slump value and air content were measured, and the values at that point of time were recorded as the slump value and air content ($V_3$) (% by volume) at 15 minutes after the start of kneading.

The increases in air content were calculated according to the formula given below. The results are shown in Table 5.

Increase in air content (% by volume) in the period of 5 to 15 minutes after the start of kneading= [Air content ($V_3$) (% by volume) at 15 minutes after the start of kneading]−[Air content ($V_1$) (% by volume) at 5 minutes after the start of kneading]

Increase in air content (% by volume) in the period of 5 to 10 minutes after the start of kneading= [Air content ($V_2$) (% by volume) at 10 minutes after the start of kneading]−[Air content ($V_1$) (% by volume) at 5 minutes after the start of kneading.

For the determination of spacing factor value and specific surface value, an aggregate fraction 6 mm or larger in size was removed from the concrete composition at 5 minutes after the start of kneading, a syringe was packed with 20 cm³ of the mortar free of said aggregate fraction, and the measurements were carried out using Dansk Beton Teknik's DBT Air Void Analyzer.

The freeze-thaw durability evaluations were made based on the changes in relative dynamic modulus of elasticity as obtained by carrying out 300 test cycles according to ASTM C 666, method A (rapid freezing and thawing in water).

These results are shown in Table 5.

TABLE 5

|  |  | Example 20 | Comparative Example 3 |
|---|---|---|---|
| Dispersant |  | Copolymer(4) | Co-polymer(1) |
| Dispersant addition level |  | 0.16 | 0.16 |
| Slump (cm) | After 5 min. | 20 | 20.5 |
|  | After 10 min. | 6.5 | 8.5 |
|  | After 15 min. | 2.5 | 4.5 |
| Air content (volume %) | After 5 min. ($V_1$) | 7.5 | 6.6 |
|  | After 10 min. ($V_2$) | 6.8 | 6.5 |
|  | After 15 min. ($V_3$) | 5.1 | 6.3 |
| Air content increase | $V_2 - V_1$ (volume %) | −0.7 | −0.1 |
|  | $V_3 - V_1$ (volume %) | −2.4 | −0.3 |
| Spacing factor value (mm) at 5 minutes after start of kneading |  | 0.233 | 0.358 |
| Specific surface area value (mm$^{-1}$) at 5 minutes after start of kneading |  | 22.9 | 17.1 |
| Freeze-thaw durability test |  | 100 | 80 |

Remarks are made referring to Table 5. The dispersant dosage is the amount of the dispersant (copolymer (1) or copolymer (4)) added as expressed in terms of percentage by mass relative to 100% by mass of cement. As for the air content increases, $V_2-V_1$ (% by volume) is the increase (% by volume) in air content in the period of 5 to 10 minutes after the start of kneading, and $V_3-V_1$ (% by volume) is the increase (% by volume) in air content in the period of 5 to 15 minutes after the start of kneading.

As can be seen from Table 5, it is evident that the copolymer (4) used according to the present invention will not allow the air content to increase even upon continued kneading of the concrete composition and gives a smaller spacing factor value as compared with the product for comparison, hence is superior in freeze-thaw durability.

EXAMPLES 21 TO 25 AND COMPARATIVE EXAMPLE 4

The water reducing agents used in Examples 21 to 25 are shown below.

(Copolymer (5))

Copolymer of polyethylene glycol mono(3-methyl-3-buthenyl) ether (average number of moles of ethylene oxide added: 50) and disodium maleate in a mass ratio of 87.7/12.3; weight average molecular weight 26,300.

(Copolymer (6))

Copolymer of polyethylene glycol monomethallyl ether (average number of moles of ethylene oxide added: 75) and sodium acrylate in a mass ratio of 87/13; weight average molecular weight 29,200.

(Copolymer (7))

Copolymer of polyethylene glycol monomethallyl ether (average number of moles of ethylene oxide added: 75) and disodium maleate in a mass ratio of 91.3/8.7; weight average molecular weight 31,000.

(Admixture (1))

The admixture (1) is a mixture of the copolymer (2) mentioned above, the copolymer (8) and copolymer (9) mentioned below, and the polyoxyalkylene compound (1) in the following mixing ratio:
Copolymer (2): 23% by mass
Copolymer (8): 47% by mass
Copolymer (9): 15% by mass
Polyoxyalkylene compound (1): 15% by mass

PRODUCTION EXAMPLE 8

A glass reactor equipped with a thermometer, stirrer, dropping funnel, nitrogen inlet tube and reflux condenser was charged with 597.4 g of water, the reactor inside atmosphere was substituted with nitrogen with stirring, and the charge was heated to 75° C. in a nitrogen atmosphere. Then, an aqueous monomer solution composed of 633.1 g of methoxypolyethylene glycol monomethacrylate (average number of moles of ethylene oxide added: 6), 167.2 g of methacrylic acid, 9.2 g of 3-mercaptopropionic acid and 165.5 g of water was added dropwise over 5 hours and, in parallel, 84.0 g of a 11.1% aqueous solution of ammonium persulfate was added dropwise over 6 hours. After completion of the dropwise addition of the 11.1% aqueous solution of ammonium persulfate, the temperature was further maintained at 75° C. for 1 hour to drive the polymerization reaction to completion, and the reaction mixture was neutralized to pH 7.0 with a 30% aqueous solution of sodium hydroxide to give a copolymer (8) with a weight average molecular weight of 15,000 in the form of an aqueous medium solution comprising the copolymer.

PRODUCTION EXAMPLE 9

(Method of Producing Monomer (1) for Preparing Copolymer (9))

A glass reaction vessel equipped with a thermometer, stirrer, dropping funnel, air inlet tube and reflux condenser was charged with 600 g of a polyethyleneimine-ethylene oxide adduct (compound resulting from addition of 3 moles, on average, of ethylene oxide to the active hydrogen atoms of polyethyleneimine with Mw 600), 0.123 g of methoquinone and 18.45 g of acetic acid, and the temperature was maintained at 90 to 95° C. for 30 minutes. Then, while the temperature was maintained at 90 to 95° C., 47.35 g of glycidyl methacrylate was added dropwise to the reaction vessel over 60 minutes. Thereafter, the temperature was maintained at 90 to 95° C. for 1 hour and then lowered to 65° C., and 990.4 g of water and 78.6 g of methacrylic acid were added to adjust the pH to 7.0. A polyethyleneimine-ethylene oxide adduct-derived monomer (1) was thus synthesized.

PRODUCTION EXAMPLE 10

A glass reactor equipped with a thermometer, stirrer, dropping funnel, nitrogen inlet tube and reflux condenser was charged with 1100 g of water, the reactor inside atmosphere was substituted with nitrogen with stirring, and the charge was heated to 70° C. in a nitrogen atmosphere. Then, an aqueous monomer solution composed of 1286.3 g of methoxypolyethylene glycol monomethacrylate (average number of moles of ethylene oxide added: 4), 192.2 g of methacrylic acid, 192.9 g of water and 65.6 g of 3-mercaptopropionic acid as chain transfer agent, and 1,013 g of the polyethyleneimine-ethylene oxide adduct monomer (1) synthesized in Production Example 9 were added dropwise each over 4 hours and, in parallel, 352 g of a 14.8% aqueous solution of ammonium persulfate was added dropwise over 5 hours. After completion of the dropwise addition of the 14.8% aqueous solution of ammonium persulfate, the temperature was further maintained at 70° C. for 1 hour to drive the polymerization reaction to completion, followed by neutralization to pH 7.0 with a 30% aqueous solution of sodium hydroxide, which gave a copolymer (9) with a weight average molecular weight of 9,000 in the form of an aqueous medium solution comprising the copolymer. The polyoxyalkylene compound (1) is a compound resulting from addition of 3 moles, on average, of ethylene oxide to the active hydrogen atom of polyethyleneimine of a polyethyleneimine-polyethylene oxide adduct (Mw: 1800).

<Mortar Test>

Mortar samples were prepared by adding the cement admixture of the present invention obtained in the above-mentioned production example or the cement admixture for comparison, and the flow value and air content were measured. The materials used and the mortar formulation were as follows: 1590 g of Taiheiyo Ordinary Portland Cement, 4300 g of fine aggregate (land sand originated in the Oi river system), 684.3 g of water containing the cement additive of the present invention or the cement additive for comparison, and 36 g of water comprising an AE agent (a Master Builders' product trademarked "MicroAir" was used).

<Mortar Test Method>

Mortar was prepared by dry mixing cement for 30 seconds using a mortar mixer, then a specified amount of the cement admixture was weighed and diluted with water, the dilution was added, and the mixture was kneaded for 30 seconds to give a cement paste. The rotation of the mixer was once stopped, the specified amounts of the fine aggregate and AE agent-containing water were added to the kneading vessel (in 90 seconds). The mixture was further kneaded for 2 minutes to give a cement composition. The cement composition (mortar) obtained was subjected to the following mortar flow test.

An iron-made hollow cone (hereinafter referred to as "slump cone") having a upper end inside diameter of 5 cm, a lower end inside diameter of 10 cm and a height of 15 cm and placed on a horizontal table was filled with the cement composition to the brim. The method of filling as used was that for concrete slump testing described in JIS A 1101. The mortar-filled slump cone was gently lifted horizontally and, then, the major diameter and minor diameter of the mortar that had spread on the table were measured and the average value of them was reported as the mortar flow value. The higher this value is, the better the dispersibility is. The air content was determined using a mortar air meter. The flow value and air content measured on this occasion were recorded as the flow value and air content after 5 minutes of kneading.

After the flow value and air content measurements after 5 minutes of kneading, the mortar used for the measurements was returned to the kneading vessel, followed by further 10 minutes of kneading. Thereafter, the flow value and air content were measured by the above-mentioned methods of testing. The flow value and air content measured on this occasion were recorded as the flow value and air content after 15 minutes of kneading. The flow value and air content data for each cement admixture are shown in Table 6.

TABLE 6

|  |  | Example 21 | | Example 22 | | Example 23 | | Example 24 | | Example 25 | | Comparative Example 4 | |
| --- | --- | --- | --- | --- | --- | --- | --- | --- | --- | --- | --- | --- | --- |
| Plasticizer | Species | Copolymer(3) | | Copolymer(5) | | Copolymer(6) | | Copolymer(7) | | Admixture(1) | | Copolymer(1) | |
|  | Addition level (mass %/C) | 0.135 | | 0.165 | | 0.135 | | 0.165 | | 0.2 | | 0.135 | |
| Defoaming agent | Species | Defoaming agent(9) | | Defoaming agent(9) | | Defoaming agent(9) | | Defoaming agent(9) | | Defoaming agent(9) | | Comparative defoaming agent(1) | |
|  | Addition level (mass %/plasticizer solids) | 5 | | 5 | | 5 | | 5 | | 5* | | 1 | |
| AE agent | Species | Micro-Air | | Micro-Air | | Micro-Air | | Micro-Air | | Micro-Air | | Micro-Air | |
|  | Addition level (mass %/C) | 0.08 | | 0.08 | | 0.08 | | 0.08 | | 0.08 | | 0.08 | |
| Result |  | F1 | F2 | F1 | F2 | F1 | F2 | F1 | F2 | F1 | F2 | F1 | F2 |
|  | Flow(cm) | 257 | 178 | 205 | 149 | 230 | 165 | 200 | 143 | 199 | 172 | 203 | 116 |
|  |  | A1 | A2 | A1 | A2 | A1 | A2 | A1 | A2 | A1 | A2 | A1 | A2 |
|  | Air content(%) | 4.4 | 11.8 | 11.7 | 18 | 5 | 12.1 | 10.8 | 17.5 | 12.4 | 20 | 6.2 | 19 |

EXAMPLES 26 AND 27

<Concrete Test>

Ordinary portland cement (product of Taiheiyo Cement Corp.; specific gravity 3.16) was used as cement, Ogasa Mountain sand (specific gravity 2.62) as fine aggregate, crushed stone (specific gravity 2.65) originating in Ome as coarse aggregate, and Yokosuka City water as water. According to the formulations given below, the respective materials were weighed to give a mixing volume of 40 L and kneaded together using a tilting mixer (product of Koyo Kikai Sangyo; KYC Baby Mixer). The number of revolutions of the mixer was fixed at 20 rpm.

<Formulation 3>

Unit cement content: 350.0 kg/m$^3$
Unit water content: 161.0 kg/m$^3$
Unit fine aggregate content: 938.0 kg/m$^3$
Unit coarse aggregate content: 862.7 kg/m$^3$
Water/Cement ratio: 46%
Fine aggregate ratio: 49%

<Method of Kneading>

(1) The mixer was charged with the fine aggregate alone and, after 30 seconds of dry mixing, the rotation was stopped.

(2) Cement was added, and dry mixing was carried out for further 30 seconds.
(3) The rotation was stopped, water (95% of the specified total amount of water) comprising the water reducing agent and defoaming agent was added, and kneading was further carried out for 90 seconds.
(4) The rotation was again stopped, the coarse aggregate was added, water (5% of the specified total amount of water) comprising the AE agent was further added, and kneading was carried out for 150 seconds.
(5) A portion of the resulting concrete was taken out of the mixer for slump and air content measurements.

The slump measurement was carried out according to the Japanese Industrial Standard JIS A 1101, and the air content measurement according to the Japanese Industrial Standard JIS A 1128. The values at this point of time were recorded as the slump value and air content at 5 minutes after the start of kneading.

The spacing factor value measurements were carried out by removing aggregate fraction 6 mm or large in size from each concrete composition at 5 minutes after the start of kneading, 20 cm$^3$ of the mortar free of such aggregate fraction was filled into a syringe, and performing the measurements using Dansk Beton Teknik's DBT Air Void Analyzer. The results of the above-mentioned tests are shown in Table 7.

TABLE 7

|  |  | Example 26 | Example 27 |
|---|---|---|---|
| Dispersant | Species | Copolymer(1) | Copolymer(1) |
|  | Addition level (mass %/C) | 0.09 | 0.09 |
| AE agent | Species | Micro-Air | Micro-Air |
|  | Addition level (mass %/C) | 0.036 | 0.033 |
| Defoaming agent | Species | Defoaming agent(4) | Defoaming agent(12) |
|  | Addition level (mass %/plasticizer solids) | 10 | 5 |
| Result | Slump value after 5 minutes(cm) | 20.5 | 20 |
|  | Air content after 5 minutes(%) | 7.2 | 6.5 |
|  | Spacing factor value (mm) | 0.29 | 0.26 |

As is evident from Table 7, the defoaming agent (12) having carbon chains containing 14 to 18 carbon atoms can give a smaller spacing factor value, namely a better quality of air, as compared with the defoaming agent (4) having a carbon chain containing 12 carbon atoms.

INDUSTRIAL APPLICABILITY

The concrete composition of the present invention, which has the constitution described above, will not show any substantial increase in air content but can stably retain the entrained air content even when the time of kneading in the production of the concrete composition is prolonged. It can form curing products excellent in strength and durability. Owing to its good foam quality, it is excellent in freeze-thaw durability and shows good storage stability with respect to the air content, hence it can form curing products excellent in strength and durability.

The present application claims priority under 35 U.S.C. §119 to Japanese Patent Application No.2002-029845, filed Feb. 6, 2002, entitled "CONCRETE COMPOSITION." and Japanese Patent Application No.2002-030998, filed Feb. 7, 2002, entitled "CONCRETE COMPOSITION.".

The contents of these applications are incorporated herein by reference in their entirety.

The invention claimed is:

1. A concrete composition comprising an defoaming agent, a polycarboxylic acid polymer, cement, water, fine aggregate and coarse aggregate, as essential constituents, wherein said defoaming agent comprises a polyoxyalkylene compound having at least one nitrogen atom within the molecule and having an oxyethylene group or groups and an oxyalkylene group or groups containing not less than 3 carbon atoms and further having an aliphatic hydrocarbon structure containing at least 5 consecutively bound carbon atoms; and wherein said polyoxyalkylene compound satisfies the relationship 0.15<u/(u+v)<0.9 where u is the total number of moles of the oxyethylene group added and v is the total number of moles of the oxyethylene group(s) containing not less than 3 carbon atoms added.

2. The concrete composition according to claim 1 wherein said concrete composition has a spacing factor value of not more than 0.3 mm and shows an increase in air content of not more than 3% in the period of 5–15 minutes after the start of kneading.

3. The concrete composition according to claim 2 which shows a specific surface value of not less than 20 mm$^{-1}$.

4. The concrete composition according to claim 2 wherein said polycarboxylic acid polymer is a coplymer composed of a constituent unit (I') represented by the following general formula (1):

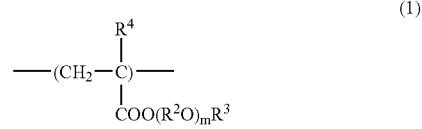

wherein R$^1$ represents a hydrogen atom or a methyl group, R$^2$O represents an oxyalkylene group containing 2 to 4 carbon atoms, R$^3$ represents a hydrocarbon group containing 4 to 30 carbon atoms and m represents the average number of moles of the oxyalkylene group added and is 2 to 300, and a constituent unit (II') represented by the following general formula (2):

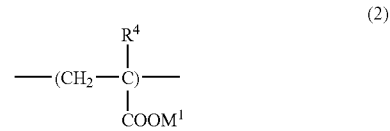

wherein R$^4$ represents a hydrogen atom or a methyl group and M$^1$ represents a hydrogen atom, a univalent metal, a bivalent metal, an ammonium group or an organic amine group, as essential constituent units.

5. The concrete composition according to claim 2, wherein said polycarboxylic acid polymer is one in which R$^3$ in the general formula (1) is a hydrocarbon group containing 4 or 5 carbon atoms and m is 50 to 300.

6. The concrete composition according to claim 2, wherein the mass proportion of water to cement is not more than 50% by mass.

7. The concrete composition according to claim 3,
wherein said polycarboxylic acid polymer is a copolymer composed of a constituent unit (I') represented by the following general formula (1):

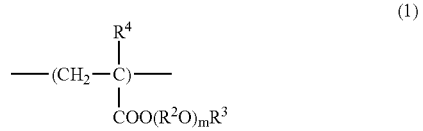

wherein $R^1$ represents a hydrogen atom or a methyl group, $R^2$O represents an oxyalkylene group containing 2 to 4 carbon atoms, $R^3$ represents a hydrocarbon group containing 4 to 30 carbon atoms and m represents the average number of moles of the oxyalkylene group added and is 2 to 300, and a constituent unit (II') represented by the following general formula (2):

wherein $R^4$ represents a hydrogen atom or a methyl group and $M^1$ represents a hydrogen atom, a univalent metal, a bivalent metal, an ammonium group or an organic amine group, as essential constituent units.

8. The concrete composition according to claim 3,
wherein said polycarboxylic acid polymer is one in which $R^3$ in the general formula (1) is a hydrocarbon group containing 4 or 5 carbon atoms and m is 50 to 300.

9. The concrete composition according to claim 4,
wherein said polycarboxylic acid polymer is one in which $R^3$ in the general formula (1) is a hydrocarbon group containing 4 or 5 carbon atoms and m is 50 to 300.

10. The concrete composition according to claim 3,
wherein the mass proportion of water to cement is not more than 50% by mass.

11. The concrete composition according to claim 4,
wherein the mass proportion of water to cement is not more than 50% by mass.

12. The concrete composition according to claim 5
wherein the mass proportion of water to cement is not more than 50% by mass.

* * * * *